(12) United States Patent
Kim et al.

(10) Patent No.: US 10,813,008 B2
(45) Date of Patent: Oct. 20, 2020

(54) COMMUNICATION METHOD AND ELECTRONIC DEVICE

(71) Applicant: Samsung Electronics Co., Ltd., Suwon-si, Gyeonggi-do (KR)

(72) Inventors: Hye-Jeong Kim, Suwon-si (KR); Yu-Shin Kim, Hwaseong-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 198 days.

(21) Appl. No.: 15/168,956

(22) Filed: May 31, 2016

(65) Prior Publication Data
US 2016/0353334 A1 Dec. 1, 2016

(30) Foreign Application Priority Data

May 29, 2015 (KR) ........................ 10-2015-0076676

(51) Int. Cl.
*H04W 36/00* (2009.01)
*H04W 28/02* (2009.01)
(Continued)

(52) U.S. Cl.
CPC ......... *H04W 36/0022* (2013.01); *H04J 11/00* (2013.01); *H04W 28/0236* (2013.01);
(Continued)

(58) Field of Classification Search
CPC ..... H04L 12/66; H04L 12/6418; H04L 29/06; H04L 45/00; H04L 45/22; H04L 47/11; H04L 47/762; H04L 47/801; H04L 47/805; H04L 47/822; H04L 47/826; H04L 47/829; H04L 2012/6472; H04L 2012/6481; H04L 69/14; H04W 28/0236; H04W 28/0215; H04W 24/04; H04W 28/0252; H04W 36/00; H04W 28/02; H04W 60/04; H04W 68/02; H04W 76/06; H04W 36/0022;
(Continued)

(56) References Cited

U.S. PATENT DOCUMENTS 6,282,192 B1 * 8/2001 Murphy et al.
6,510,219 B1 * 1/2003 Wellard et al.
(Continued)

FOREIGN PATENT DOCUMENTS

CN 101056283 A 10/2007
CN 101543117 A 9/2009
(Continued)

OTHER PUBLICATIONS

Chinese Office Action dated Apr. 9, 2020, issued in Chinese Patent Application No. 201610364441.9.

*Primary Examiner* — Marsha D Banks Harold
*Assistant Examiner* — Dharmesh J Patel
(74) *Attorney, Agent, or Firm* — Jefferson IP Law, LLP

(57) ABSTRACT

A method for communicating by an electronic device is provided. The method includes acquiring a value indicating a signal quality of a first network that provides a packet data based call service, when the acquired value satisfies a first condition, receiving a call or transmitting a call request through a second network that provides a circuit-switching based call service, and, when the acquired value satisfies a second condition, receiving a call or transmitting a call request through the first network.

8 Claims, 14 Drawing Sheets

(51) Int. Cl.
*H04J 11/00* (2006.01)
*H04W 68/02* (2009.01)
*H04W 76/36* (2018.01)
*H04W 60/04* (2009.01)
*H04W 88/06* (2009.01)
*H04W 48/18* (2009.01)

(52) U.S. Cl.
CPC ........... *H04W 68/02* (2013.01); *H04W 76/36* (2018.02); *H04W 48/18* (2013.01); *H04W 60/04* (2013.01); *H04W 88/06* (2013.01)

(58) Field of Classification Search
CPC .... H04J 11/00; H04M 7/0057; H04Q 3/0045; H04Q 2213/13034; H04Q 2213/13093; H04Q 2213/13167; H04Q 2213/13201; H04Q 2213/13296; H04Q 2213/01
See application file for complete search history.

(56) References Cited

U.S. PATENT DOCUMENTS

| | | | |
|---|---|---|---|
| 2013/0100887 A1* | 4/2013 | Kim | H04L 65/1046 370/328 |
| 2013/0235740 A1* | 9/2013 | Kim | H04W 36/0022 370/252 |
| 2014/0087723 A1* | 3/2014 | Cili et al. | |
| 2014/0126544 A1 | 5/2014 | Khay-Ibbat et al. | |
| 2015/0065127 A1 | 3/2015 | Mutya et al. | |
| 2015/0282013 A1* | 10/2015 | Kim | H04L 65/1069 370/331 |

FOREIGN PATENT DOCUMENTS

| | | |
|---|---|---|
| CN | 101730070 A | 6/2010 |
| CN | 102546998 A | 7/2012 |
| EP | 2 925 056 A2 | 9/2015 |
| WO | 2014/210256 A1 | 12/2014 |

* cited by examiner

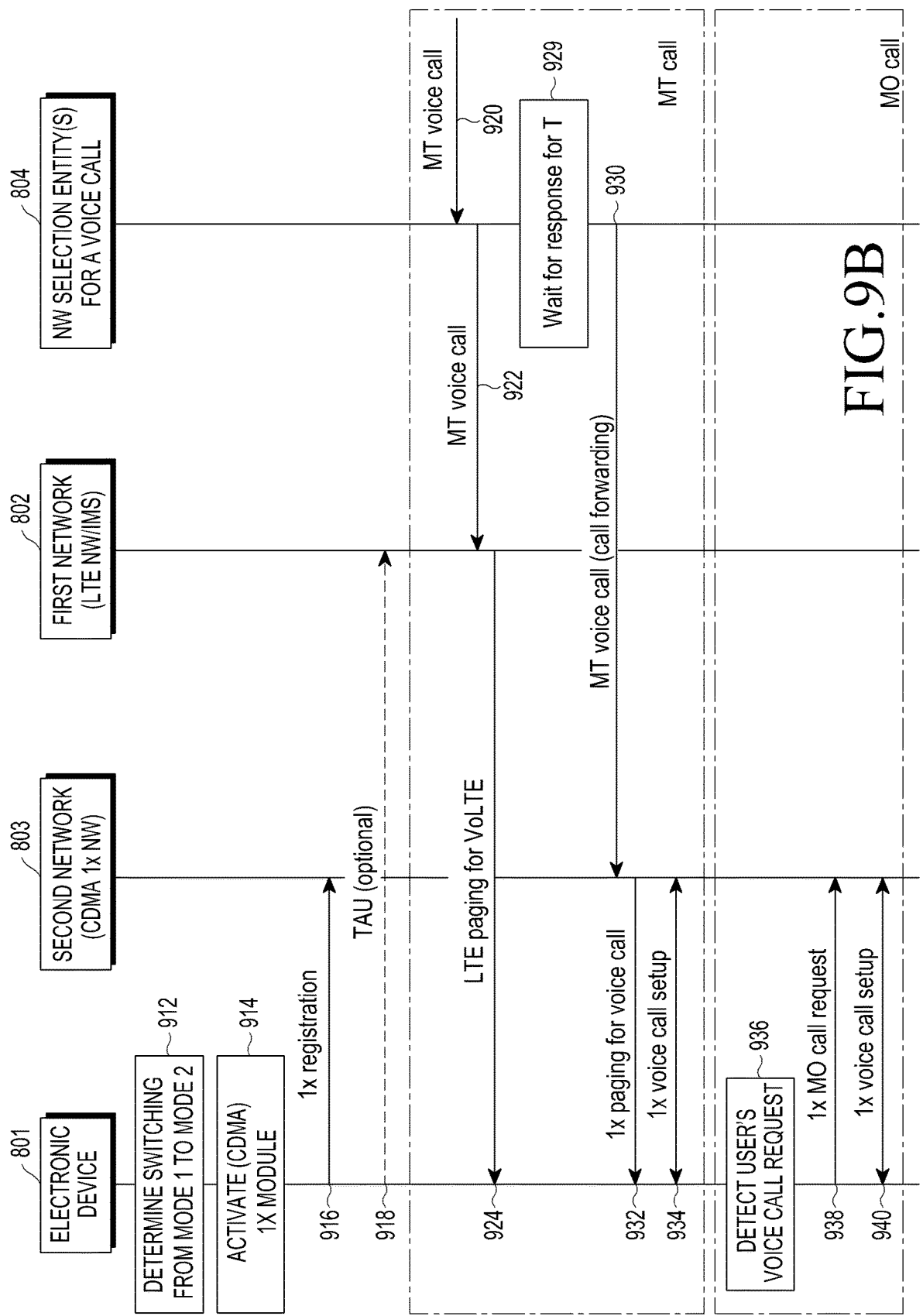

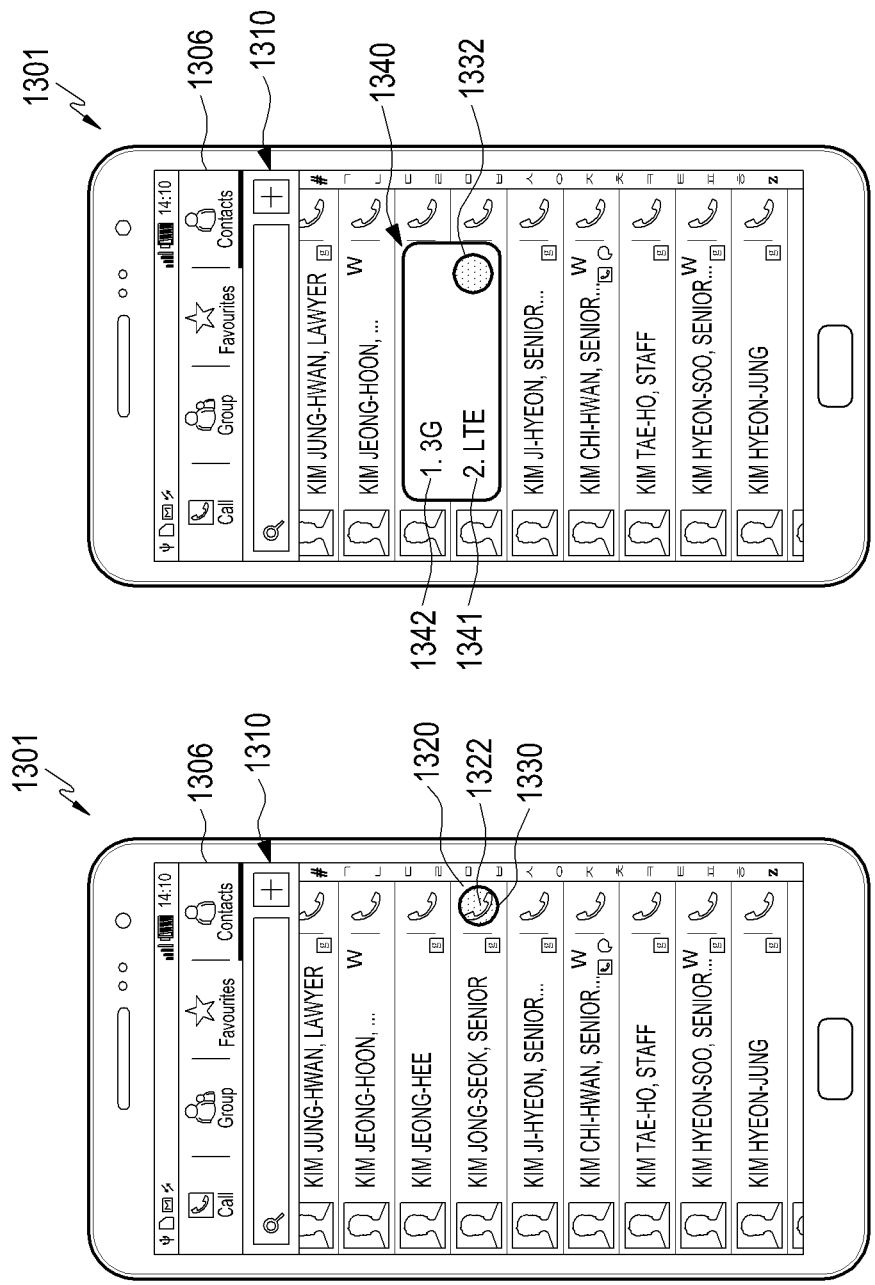

COMMUNICATION METHOD AND ELECTRONIC DEVICE

CROSS-REFERENCE TO RELATED APPLICATION(S)

This application claims the benefit under 35 U.S.C. § 119(a) of a Korean patent application filed on May 29, 2015 in the Korean Intellectual Property Office and assigned Serial number 10-2015-0076676, the entire disclosure of which is hereby incorporated by reference.

TECHNICAL FIELD

The present disclosure relates to an electronic device for providing a call service in a mobile communication system and a method therefor.

BACKGROUND

In general, a mobile communication system is developed to provide voice services while guaranteeing activity of users. However, the mobile communication system has been increasingly extended a service providing area to a data service in addition to a voice service, and is now evolving into a form that provides various high-speed, large capacity services to an electronic device of a user. A typical example of such a mobile communication system includes a long term evolution (LTE) mobile communication system, a long term evolution-advanced (LTE-A) mobile communication system, a high speed downlink packet access (HSDPA) mobile communication system, a high speed uplink packet access (HSUPA) mobile communication systems, a high rate packet data (HRPD) mobile communication system of 3rd generation project partnership 2 (3GPP2), wideband code division multiple access (WCDMA) mobile communication system of the 3GPP2, code division multiple access (CDMA) mobile communication system of the 3GPP2, an Institute of Electrical and Electronics Engineers (IEEE) 802.16m communication system, an evolved packet system (EPS), a mobile internet protocol (mobile IP) system, and/or the like.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below.

When long term evolution (LTE) coverage is small compared to circuit switched (CS) due to the limitation on networks or limitation on electronic devices, a weak electric field area may exist in which an LTE network is available but a voice over long term evolution (VoLTE) call service is not smooth.

In the prior art, since a CS call is used only when the VoLTE is not available, a VoLTE mobile originating (MO)/mobile terminating (MT) call may also be performed in the weak electric field area resulting in many failed calls.

In addition, when LTE out-of-service (OOS) occurs, transmission and reception of the voice call is not possible until a service is available by searching for a legacy network.

Therefore, a method for increasing the success rate of the voice call in the LTE weak electric field area is required.

In accordance with an aspect of the present disclosure, a method for communicating by an electronic device is provided. The method includes acquiring a value indicating the signal quality of a first network that provides a packet data based call service, when the acquired value satisfies a first condition, receiving a call or transmitting a call request through a second network that provides a circuit-switching based call service, and when the acquired value satisfies a second condition, receiving a call or transmitting a call request through the first network.

In accordance with another aspect of the present disclosure, an electronic device is provided. The electronic device includes a communication module, and a controller configured to acquire a value indicating the signal quality of a first network that provides a packet data based call service through the communication module, receive a call or transmit a call request through a second network that provides a circuit-switching based call service when the acquired value satisfies a first condition, and receive a call or transmit a call request through the first network when the acquired value satisfies a second condition.

In various embodiments of the present disclosure, a method is provided that may increase the success rate of the voice call in an LTE weak electric field area by selectively controlling an operation mode and a radio access technology (RAT).

In various embodiments of the present disclosure, the success rate of the call can be increased by providing a voice call service using a legacy network in an LTE weak electric field area in which the LTE signal quality is low.

In various embodiments of the present disclosure, a plurality of threshold values may be set to reduce the number of times of the operation mode changing and signaling associated with the mode change.

In various embodiments of the present disclosure, in an area in which the VoLTE call is available, the voice quality can be increased by using VoLTE as much as possible.

In various embodiments of the present disclosure, since the IMS registration state is maintained when the operation mode is changed, additional IMS signaling and network changing operations can be removed so as to simplify the procedure.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which:

FIG. 9A and FIG. 9B are flowcharts illustrating a communication method of a communication system according to various embodiments of the present disclosure;

FIGS. 13A and 13B are diagrams illustrating an operation method of an electronic device according to various embodiments of the present disclosure.

Throughout the drawings, it should be noted that like reference numbers are used to depict the same or similar elements, features, and structures.

DETAILED DESCRIPTION

Figure 1:
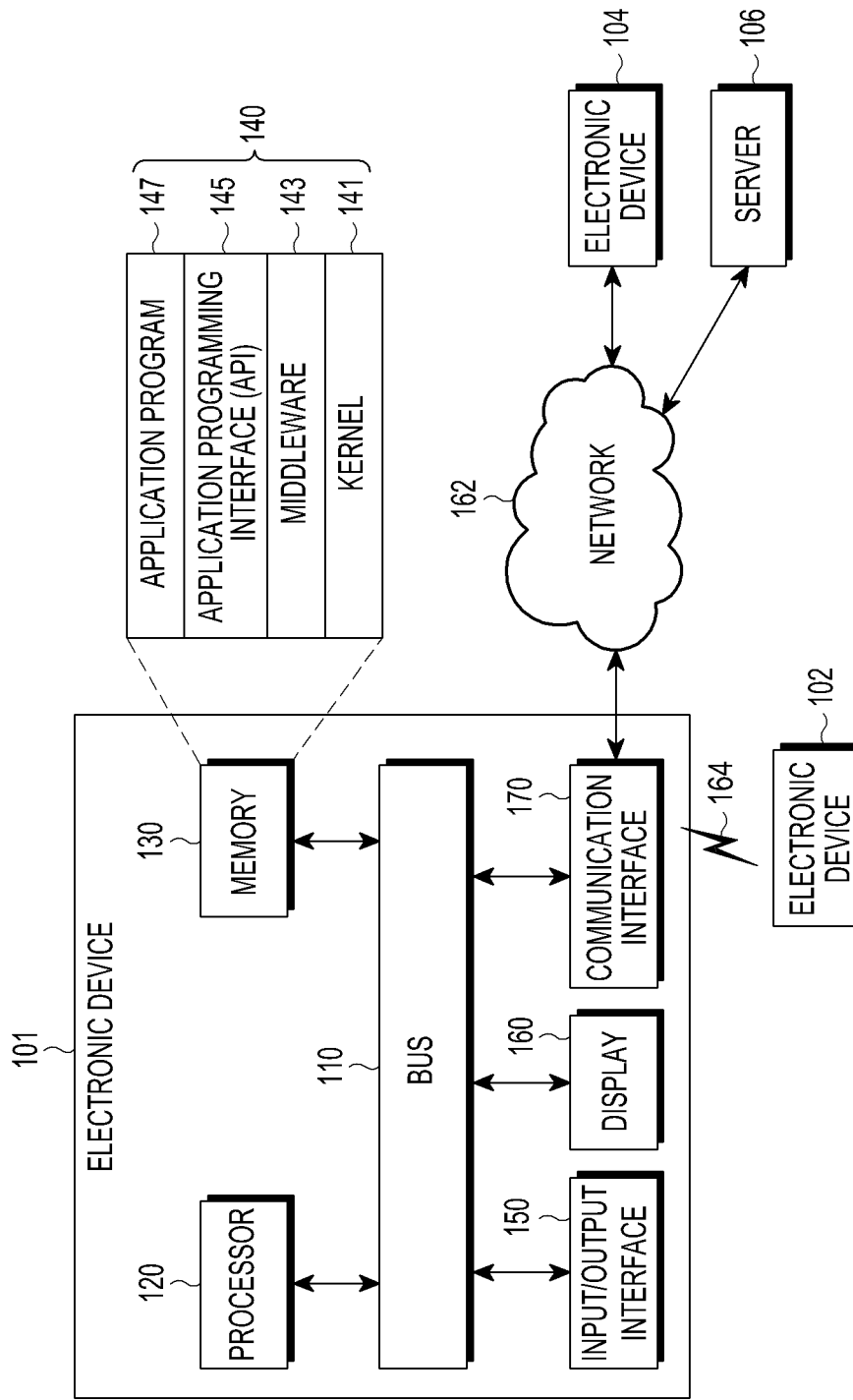
FIG. 1 is a block diagram of an electronic device within a network environment according to various embodiments of the present disclosure.

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

As used herein, the expression "have", "may have", "include", or "may include" refers to the existence of a corresponding feature (e.g., numeral, function, operation, or constituent element such as component), and does not exclude one or more additional features.

In the present disclosure, the expression "A or B", "A/B", "at least one of A or/and B", or "one or more of A or/and B" may include all possible combinations of the items listed. For example, the expression "A or B", "A/B", "at least one of A and B", or "at least one of A or B" refers to all of (1) including at least one A, (2) including at least one B, or (3) including all of at least one A and at least one B.

The expression "a first", "a second", "the first", or "the second" used in various embodiments of the present disclosure may modify various components regardless of the order and/or the importance but does not limit the corresponding components. For example, a first user device and a second user device indicate different user devices although both of them are user devices. For example, a first element may be termed a second element, and similarly, a second element may be termed a first element without departing from the scope of the present disclosure.

It should be understood that when an element (e.g., first element) is referred to as being (operatively or communicatively) "connected," or "coupled," to another element (e.g., second element), it may be directly connected or coupled directly to the other element or any other element (e.g., third element) may be interposer between them. In contrast, it may be understood that when an element (e.g., first element) is referred to as being "directly connected," or "directly coupled" to another element (second element), there are no element (e.g., third element) interposed between them.

The expression "configured to" used in the present disclosure may be exchanged with, for example, "suitable for", "having the capacity to", "designed to", "adapted to", "made to", or "capable of" according to the situation. The term "configured to" may not necessarily imply "specifically designed to" in hardware. Alternatively, in some situations, the expression "device configured to" may mean that the device, together with other devices or components, "is able to". For example, the phrase "processor adapted (or configured) to perform A, B, and C" may mean a dedicated processor (e.g. embedded processor) only for performing the corresponding operations or a generic-purpose processor (e.g., central processing unit (CPU) or application processor (AP)) that can perform the corresponding operations by executing one or more software programs stored in a memory device.

The terms used herein are merely for the purpose of describing particular embodiments and are not intended to limit the scope of other embodiments. As used herein, singular forms may include plural forms as well unless the context clearly indicates otherwise. Unless defined otherwise, all terms used herein, including technical and scientific terms, have the same meaning as those commonly understood by a person skilled in the art to which the present disclosure pertains. Such terms as those defined in a generally used dictionary may be interpreted to have the meanings equal to the contextual meanings in the relevant field of art, and are not to be interpreted to have ideal or excessively formal meanings unless clearly defined in the present disclosure. In some cases, even the term defined in the present disclosure should not be interpreted to exclude embodiments of the present disclosure.

An electronic device according to various embodiments of the present disclosure may include at least one of, for example, a smart phone, a tablet personal computer (PC), a mobile phone, a video phone, an electronic book reader (e-book reader), a desktop PC, a laptop PC, a netbook computer, a workstation, a server, a personal digital assistant (PDA), a portable multimedia player (PMP), a Moving Picture Experts Group phase 1 or phase 2 (MPEG-1 or MPEG-2) audio layer-3 (MP3) player, a mobile medical device, a camera, or a wearable device. According to various embodiments of the present disclosure, the wearable device may include at least one of an accessory type (e.g., a watch, a ring, a bracelet, an anklet, a necklace, a glasses, a contact lens, or a head-mounted device (HMD)), a fabric or clothing integrated type (e.g., an electronic clothing), a body-mounted type (e.g., a skin pad, or tattoo), or a bio-implantable type (e.g., an implantable circuit).

According to some embodiments of the present disclosure, the electronic device may be a home appliance. The smart home appliance may include at least one of, for example, a television, a digital video disk (DVD) player, an audio, a refrigerator, an air conditioner, a vacuum cleaner, an oven, a microwave oven, a washing machine, an air cleaner, a set-top box, a home automation control panel, a security control panel, a TV box (e.g., Samsung HomeSync™, Apple TV™, or Google TV™), a game console (e.g., Xbox™ and PlayStation™), an electronic dictionary, an electronic key, a camcorder, or an electronic photo frame.

According to another embodiment of the present disclosure, the electronic device may include at least one of various medical devices (e.g., various portable medical measuring devices (a blood glucose monitoring device, a heart rate monitoring device, a blood pressure measuring device, a body temperature measuring device, or the like), a magnetic resonance angiography (MRA), a magnetic resonance imaging (MRI), a computed tomography (CT) machine, and an ultrasonic machine), a navigation device, a global positioning system (GPS) receiver, an event data recorder (EDR), a flight data recorder (FDR), a Vehicle Infotainment Devices, an electronic devices for a ship (e.g., a navigation device for a ship, and a gyro-compass), avionics, security devices, an automotive head unit, a robot for home or industry, an automatic teller's machine (ATM) in banks, point of sales (POS) in a shop, or internet device of things (e.g., a light bulb, various sensors, electric or gas meter, a sprinkler device, a fire alarm, a thermostat, a streetlamp, a toaster, a sporting goods, a hot water tank, a heater, a boiler, or the like).

According to some embodiments of the present disclosure, the electronic device may include at least one of a part of furniture or a building/structure, an electronic board, an electronic signature receiving device, a projector, or various kinds of measuring instruments (e.g., a water meter, an electric meter, a gas meter, and a radio wave meter). In various embodiments of the present disclosure, the electronic device may be a combination of one or more of the aforementioned various devices. According to some embodiments of the present disclosure, the electronic device may also be a flexible device. Further, the electronic device according to an embodiment of the present disclosure is not limited to the aforementioned devices, and may include a new electronic device according to the development of technology.

Hereinafter, an electronic device according to various embodiments will be described with reference to the accompanying drawings. In the present disclosure, the term "user" may indicate a person using an electronic device or a device (e.g. an artificial intelligence electronic device) using an electronic device.

FIG. 1 is a block diagram of an electronic device within a network environment according to various embodiments of the present disclosure.

Referring to FIG. 1, an electronic device 101 within a network environment, according to various embodiments of the present disclosure, will be described with reference to FIG. 1. The electronic device 101 may include a bus 110, a processor 120, a memory 130, an input/output interface 150, a display 160, and a communication circuit 170. In some embodiments of the present disclosure, the electronic device 101 may omit at least one of the above elements or may further include other elements.

The bus 110 may include, for example, a circuit for connecting the elements 120 and 130 to 180 and transferring communication (e.g., control messages and/or data) between the elements.

The processor 120 may include one or more of a CPU, an AP, and a communication processor (CP). For example, the processor 120 may carry out operations or data processing relating to control and/or communication of at least one other element of the management device 101. The processor 120 may be referred to as a controller, or include the controller as a part thereof, or configure the controller.

The memory 130 may include a volatile memory and/or a non-volatile memory. The memory 130 may store, for example, instructions or data related to at least one other element of the electronic device 101. According to an embodiment of the present disclosure, the memory 130 may store software and/or a program 140. The program 140 may include a kernel 141, middleware 143, an application programming interface (API) 145, and/or application programs (or "applications") 147. At least some of the kernel 141, the middleware 143, and the API 145 may be referred to as an operating system (OS).

For example, the kernel 141 may control or manage system resources (for example, the bus 110, the processor 120, and the memory 130) which are used to execute an operation or a function implemented in the other programs (for example, the middleware 143, the API 145, and the application programs 147). Furthermore, the kernel 141 may provide an interface through which the middleware 143, the API 145, or the application programs 147 may access the individual elements of the electronic device 101 to control or manage the system resources.

The middleware 143, for example, may function as an intermediary for allowing the API 145 or the application programs 147 to communicate with the kernel 141 to exchange data.

In addition, the middleware 143 may process one or more task requests received from the application programs 147 according to priorities thereof. For example, the middleware 143 may assign priorities for using the system resources (for example, the bus 110, the processor 120, the memory 130, or the like) of the electronic device 101, to at least one of the application programs 147. For example, the middleware 143 may perform scheduling or load balancing on the one or more task requests by processing the one or more task requests according to the priorities assigned thereto.

The API 145 is an interface through which the applications 147 control functions provided from the kernel 141 or the middleware 143, and may include, for example, at least one interface or function (e.g., instruction) for file control, window control, image processing, or text control.

The input/output interface 150 may function as, for example, an interface that may transfer instructions or data input from a user or another external device to the other element(s) of the electronic device 101. Furthermore, the input/output interface 150 may output the instructions or data received from the other element(s) of the electronic device 101 to the user or another external device.

Examples of the display 160 may include a liquid crystal display (LCD), a light-emitting diode (LED) display, an organic light-emitting diode (OLED) display, a microelectromechanical systems (MEMS) display, and an electronic paper display. The display 160 may display, for example, various types of contents (for example, text, images, videos, icons, or symbols) for the user. The display 160 may include a touch screen and receive, for example, a touch, gesture, proximity, or hovering input using an electronic pen or the user's body part.

The communication interface 170 may set communication between, for example, the electronic device 101 and an external device (for example, a first external electronic device 102, a second external electronic device 104, or a server 106). For example, the communication interface 170 may be connected to a network 162 through wireless or wired communication to communicate with the external device (for example, the external electronic device 104 or the server 106). The communication interface 170 may include a CP, and the CP may be included in one module of a plurality of modules configuring the communication interface 170. In an embodiment of the present disclosure, the CP may be included in the processor 120.

The wireless communication may use at least one of, for example, long term evolution (LTE), LTE-advance (LTE-A), code division multiple access (CDMA), wideband CDMA (WCDMA), universal mobile telecommunications system (UMTS), wibro (Wireless Broadband), or global system for mobile communications (GSM), as a cellular communication protocol. In addition, the wireless communication may include, for example, short range communication 164. The short-range communication 164 may be performed by using at least one of, for example, Wi-Fi, Bluetooth, near field communication (NFC), or global navigation satellite system (GNSS). The GNSS may include at least one of, for example, a GPS, a global navigation satellite system (Glonass), a Beidou navigation satellite system (hereinafter, referred to as "Beidou"), or Galileo (European global satellite-based navigation system) according to an area in which the GNSS is used or a bandwidth of the GNSS. Hereinafter, in the present disclosure, the term "GPS" may be interchangeably used with the term "GNSS". The wired communication may include at least one of, for example, a universal serial bus (USB), a high definition multimedia interface (HDMI), recommended standard 232 (RS-232), or a plain old telephone service (POTS). The network 162 may include at least one of a communication network such as a computer network (e.g., a local area network (LAN) or a wide area network (WAN)), the Internet, or a telephone network.

Each of the first and second external electronic devices 102 and 104 may be a device which is the same as or different from the electronic device 101. According to an embodiment of the present disclosure, the server 106 may include a group of one or more servers. According to various embodiments of the present disclosure, all or some of the operations performed in the electronic device 101 may be performed in another electronic device or a plurality of electronic devices (for example, the electronic devices 102 and 104 or the server 106). According to an embodiment of the present disclosure, when the electronic device 101 has to perform some functions or services automatically or in response to a request, the electronic device 101 may make a request for performing at least some functions relating thereto to another device (for example, the electronic device 102 or 104 or the server 106) instead of performing the functions or services by itself or in addition. Another electronic device (for example, the electronic device 102 or 104, or the server 106) may execute the requested functions or the additional functions, and may deliver a result of the execution to the electronic device 101. The electronic device 101 may process the received result as it is or additionally to provide the requested functions or services. To achieve this, for example, cloud computing, distributed computing, or client-server computing technology may be used.

Figure 2:
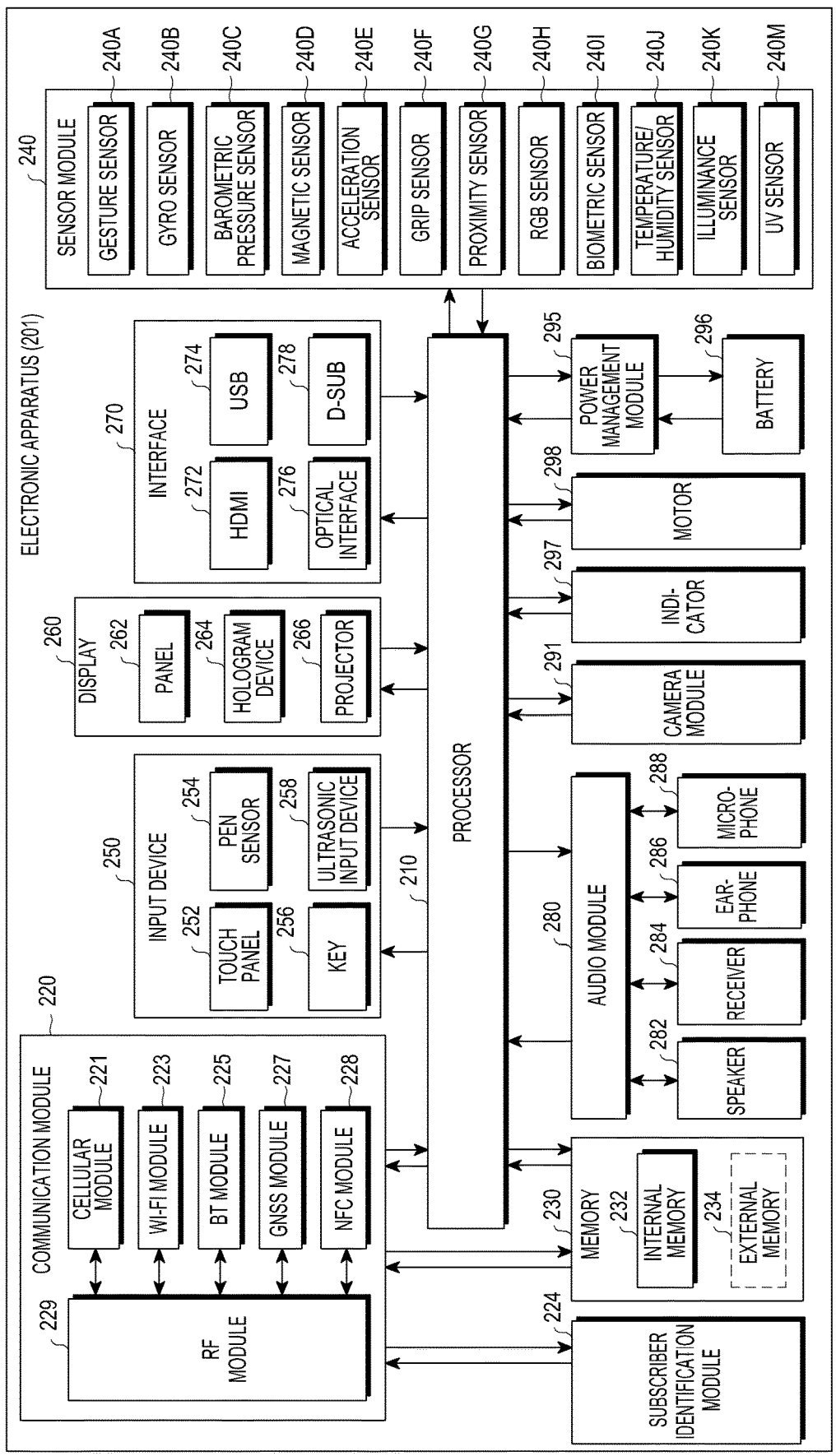
FIG. 2 is a block diagram of an electronic device according to various embodiments of the present disclosure.

FIG. 2 is a block diagram of an electronic device according to various embodiments of the present disclosure.

Referring to FIG. 2, the electronic device 201 may include, for example, the whole or part of the electronic device 101 illustrated in FIG. 1. The electronic device 201 may include one or more processors (e.g., AP) 210, a communication module 220, a memory 230, a sensor module 240, an input device 250, and a display 260, and the electronic device 201 may further include at least one of a subscriber identification module 224, an interface 270, an audio module 280, a camera module 291, a power management module 295, a battery 296, an indicator 297, or a motor 298.

The processor 210 may control a plurality of hardware or software components connected to the processor 210 by driving an OS or an application program and perform processing of various pieces of data and calculations. The processor 210 may be implemented by, for example, a system on chip (SoC). According to an embodiment of the present disclosure, the processor 210 may further include a graphic processing unit (GPU) and/or an image signal processor (ISP). The processor 210 may include at least some (for example, a cellular module 221) of the elements illustrated in FIG. 2. The processor 210 may load, into a volatile memory, instructions or data received from at least one (for example, a non-volatile memory) of the other elements and may process the loaded instructions or data, and may store various data in a non-volatile memory.

The communication module 220 may have a configuration equal or similar to that of the communication interface 170 of FIG. 1. The communication module 220 may include, for example, a cellular module 221, a Wi-Fi module 223, a Bluetooth module 225, a GNSS module 227 (e.g., a GPS module, a Glonass module, a Beidou module, or a Galileo module), an NFC module 228, and a radio frequency (RF) module 229.

The cellular module 221 may provide a voice call, an image call, a text message service, or an Internet service through, for example, a communication network. According to an embodiment of the present disclosure, the cellular module 221 may identify and authenticate the electronic device 201 within a communication network using a subscriber identification module (for example, the SIM card 224). According to an embodiment of the present disclosure, the cellular module 221 may perform at least some of the functions that the processor 210 may provide. According to an embodiment of the present disclosure, the cellular module 221 may include a CP.

The Wi-Fi module 223, the Bluetooth module 225, the GNSS module 227, or the NFC module 228 may include, for example, a processor that processes data transmitted and received through the corresponding module. According to some embodiments of the present disclosure, at least some (two or more) of the cellular module 221, the Wi-Fi module 223, the Bluetooth module 225, the GNSS module 227, and the NFC module 228 may be included in one integrated chip (IC) or IC package.

The RF module 229 may transmit/receive, for example, a communication signal (for example, an RF signal). The RF module 229 may include, for example, a transceiver, a power amplifier module (PAM), a frequency filter, a low noise amplifier (LNA), and an antenna. According to another embodiment of the present disclosure, at least one of the cellular module 221, the Wi-Fi module 223, the BT module 225, the GPS module 227, or the NFC module 228 may transmit/receive an RF signal through a separate RF module.

The subscriber identification module 224 may include, for example, a card including a subscriber identity module and/or an embedded SIM, and may contain unique identification information (for example, an integrated circuit card identifier (ICCID)) or subscriber information (for example, an international mobile subscriber identity (IMSI)).

The memory 230 (for example, the memory 130) may include, for example, an internal memory 232 or an external memory 234. The internal memory 232 may include at least one of a volatile memory (for example, a dynamic random access memory (DRAM), a static RAM (SRAM), a synchronous Dynamic RAM (SDRAM), and/or the like) or a non-volatile memory (for example, a one time programmable read only memory (OTPROM), a programmable ROM (PROM), an erasable and programmable ROM (EPROM), an electrically erasable and programmable ROM (EEPROM), a mask ROM, a flash ROM, a flash memory (for example, a NAND flash memory or a NOR flash memory), a hard disk drive, a solid state drive (SSD), and/or the like).

The external memory 234 may further include a flash drive, for example, a compact flash (CF), a secure digital (SD), a micro-SD, a mini-SD, an extreme digital (xD), a multi-media card (MMC), a memory stick, or the like. The external memory 234 may be functionally and/or physically connected to the electronic apparatus 201 through various interfaces.

The sensor module 240 may measure a physical quantity or detect an operation state of the electronic device 201, and may convert the measured or detected information into an electrical signal. The sensor module 240 may include, for example, at least one of a gesture sensor 240A, a gyro sensor 240B, an atmospheric pressure sensor 240C, a magnetic sensor 240D, an acceleration sensor 240E, a grip sensor 240F, a proximity sensor 240G, a color sensor 240H (for example, a red, green, blue (RGB) sensor), a biometric sensor 240I, a temperature/humidity sensor 240J, a light sensor 240K, or a ultraviolet (UV) sensor 240M. Additionally or alternatively, the sensor module 240 may include, for example, an E-nose sensor, an electromyography (EMG) sensor, an electroencephalogram (EEG) sensor, an electrocardiogram (ECG) sensor, an infrared (IR) sensor, an iris sensor, and/or a fingerprint sensor. The sensor module 240 may further include a control circuit for controlling one or more sensors included therein. In some embodiments of the present disclosure, the electronic device 201 may further include a processor configured to control the sensor module 240 as a part of or separately from the processor 210, and may control the sensor module 240 while the processor 210 is in a sleep state.

The input device 250 may include, for example, a touch panel 252, and the input device 250 may further include at least one of a (digital) pen sensor 254, a key 256, or an ultrasonic input device 258. The touch panel 252 may use at least one of, for example, a capacitive type, a resistive type, an infrared type, or an ultrasonic type. Also, the touch panel 252 may further include a control circuit. The touch panel 252 may further include a tactile layer and provide a tactile reaction to the user.

The (digital) pen sensor 254 may include, for example, a recognition sheet which is a part of the touch panel or is separated from the touch panel. The key 256 may include, for example, a physical button, an optical key or a keypad. The ultrasonic input device 258 may detect ultrasonic waves generated by an input tool through a microphone (for example, a microphone 288) and identify data corresponding to the detected ultrasonic waves.

The display 260 (e.g., display 160) may include a panel 262, and the display 260 may further include a hologram device 264, and/or a projector 266. The panel 262 may include a configuration identical or similar to that of the display 160 illustrated in FIG. 1. The panel 262 may be implemented to be, for example, flexible, transparent, or wearable. The panel 262 and the touch panel 252 may be implemented as one module. The hologram 264 may show a three dimensional image in the air by using an interference of light. The projector 266 may display an image by projecting light onto a screen. The screen may be located, for example, inside or outside the electronic device 201. According to an embodiment of the present disclosure, the display 260 may further include a control circuit for controlling the panel 262, the hologram device 264, or the projector 266.

The interface 270 may include, for example, an HDMI 272, a USB 274, an optical interface 276, or a D-subminiature (D-sub) 278. The interface 270 may be included in, for example, the communication interface 170 illustrated in FIG. 1. Additionally or alternatively, the interface 270 may include, for example, a mobile high-definition link (MHL) interface, an SD card/MMC interface, or an infrared data association (IrDA) standard interface.

The audio module 280 may bilaterally convert, for example, a sound and an electrical signal. At least some elements of the audio module 280 may be included in, for example, the input/output interface 150 illustrated in FIG. 1. The audio module 280 may process sound information which is input or output through, for example, a speaker 282, a receiver 284, earphones 286, the microphone 288 or the like.

The camera module 291 is a device which may photograph a still image and a dynamic image. According to an embodiment of the present disclosure, the camera module 291 may include one or more image sensors (for example, a front sensor or a back sensor), a lens, an ISP or a flash (for example, LED or xenon lamp).

The power management module 295 may manage, for example, power of the electronic device 201. According to an embodiment of the present disclosure, the power management module 295 may include a power management integrated circuit (PMIC), a charger Integrated Circuit (IC), or a battery or fuel gauge. The PMIC may use a wired and/or wireless charging method. Examples of the wireless charging method may include, for example, a magnetic resonance method, a magnetic induction method, an electromagnetic method, and/or the like. Additional circuits (e.g., a coil loop, a resonance circuit, a rectifier, and/or the like) for wireless charging may be further included. The battery gauge may measure, for example, a residual quantity of the battery 296, and a voltage, a current, or a temperature during the charging. The battery 296 may include, for example, a rechargeable battery or a solar battery.

The indicator 297 may display a particular state (for example, a booting state, a message state, a charging state, or the like) of the electronic device 201 or a part (for example, the processor 210) of the electronic device 201. The motor 298 may convert an electrical signal into mechanical vibrations, and may generate a vibration or haptic effect. Although not illustrated, the electronic device 201 may include a processing unit (for example, a GPU) for supporting a mobile television (TV). The processing unit for supporting mobile TV may, for example, process media data according to a certain standard such as digital multimedia broadcasting (DMB), digital video broadcasting (DVB), or mediaFlo®.

Each of the above-described component elements of hardware according to the present disclosure may be configured with one or more components, and the names of the corresponding component elements may vary based on the type of electronic device. The electronic device according to various embodiments of the present disclosure may include at least one of the aforementioned elements. Some elements may be omitted or other additional elements may be further included in the electronic device. Also, some of the hardware components according to various embodiments may be combined into one entity, which may perform functions identical to those of the relevant components before the combination.

Figure 3:
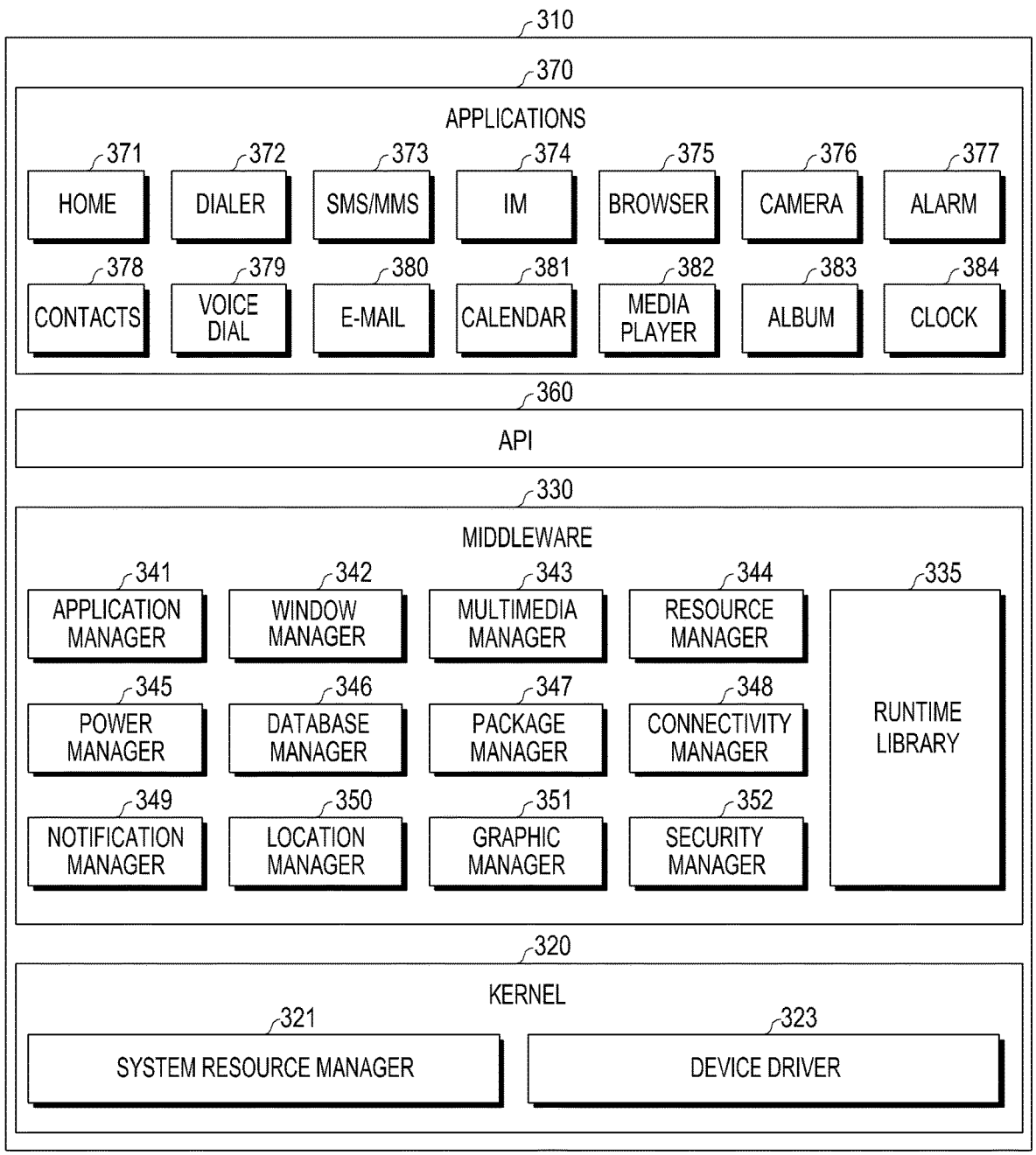
FIG. 3 is a block diagram of a program module according to various embodiments of the present disclosure.

FIG. 3 is a block diagram of a program module according to various embodiments of the present disclosure.

Referring to FIG. 3, a program module 310 (for example, the program 140) may include an OS for controlling resources related to the electronic device (for example, the electronic device 101) and/or various applications (for example, the application programs 147) executed in the OS. The OS may be, for example, Android, iOS, Windows, Symbian, Tizen, Bada, or the like.

The program module 310 may include a kernel 320, middleware 330, an API 360, and/or applications 370. At least some of the program module 310 may be preloaded on the electronic device, or may be downloaded from an external electronic device (for example, the electronic device 102 or 104, or the server 106).

The kernel 320 (for example, the kernel 141) may include, for example, a system resource manager 321 and/or a device driver 323. The system resource manager 321 may perform the control, allocation, retrieval, or the like of system resources. According to an embodiment of the present disclosure, the system resource manager 321 may include a process manager, a memory manager, a file system manager, or the like. The device driver 323 may include, for example, a display driver, a camera driver, a Bluetooth driver, a shared memory driver, a USB driver, a keypad driver, a Wi-Fi driver, an audio driver, or an inter-process communication (IPC) driver.

The middleware 330 may provide, for example, a function commonly required by the applications 370, or may provide various functions to the applications 370 through the API 360 so that the applications 370 can efficiently use limited system resources within the electronic device. According to an embodiment of the present disclosure, the middleware 330 (for example, the middleware 143) may include, for example, at least one of a runtime library 335, an application manager 341, a window manager 342, a multimedia manager 343, a resource manager 344, a power manager 345, a database manager 346, a package manager 347, a connectivity manager 348, a notification manager 349, a location manager 350, a graphic manager 351, or a security manager 352.

The runtime library 335 may include a library module which a compiler uses in order to add a new function through a programming language while the applications 370 are being executed. The runtime library 335 may perform input/output management, memory management, the functionality for an arithmetic function, or the like.

The application manager 341 may manage, for example, a life cycle of at least one of the applications 370. The window manager 342 may manage graphical user interface (GUI) resources used for the screen. The multimedia manager 343 may determine a format required to reproduce various media files, and may encode or decode a media file by using a coder/decoder (codec) appropriate for the corresponding format. The resource manager 344 may manage resources, such as a source code, a memory, a storage space, and/or the like of at least one of the applications 370.

The power manager 345 may operate together with a basic input/output system (BIOS) to manage a battery or power, and may provide power information required for the operation of the electronic device. The database manager 183G may generate, search for, and/or change a database to be used by at least one of the applications 370. The package manager 347 may manage the installation or update of an application distributed in the form of a package file.

The connectivity manager 348 may manage a wireless connection such as, for example, Wi-Fi or Bluetooth. The notification manager 349 may display or notify of an event, such as an arrival message, an appointment, a proximity notification, and/or the like, in such a manner as not to disturb the user. The location manager 350 may manage location information of the electronic device. The graphic manager 351 may manage a graphic effect, which is to be provided to the user, or a user interface related to the graphic effect. The security manager 352 may provide various security functions required for system security, user authentication, and/or the like. According to an embodiment of the present disclosure, when the electronic device (for example, the electronic device 101) has a telephone call function, the middleware 330 may further include a telephony manager for managing a voice call function or a video call function of the electronic device.

The middleware 330 may include a middleware module that forms a combination of various functions of the above-described elements. The middleware 330 may provide a module specialized for each type of OS in order to provide a differentiated function. Also, the middleware 330 may dynamically delete some of the existing elements, or may add new elements.

The API 360 (for example, the API 145) is, for example, a set of API programming functions, and may be provided with a different configuration according to an OS. For example, in the case of Android or iOS, one API set may be provided for each platform. In the case of Tizen, two or more API sets may be provided for each platform.

The applications 370 (for example, the application programs 147) may include, for example, one or more applications which can provide functions such as home 371, dialer 372, short messaging service (SMS)/multimedia messaging service (MMS) 373, instant message (IM) 374, browser 375, camera 376, alarm 377, contacts 378, voice dialer 379, email 380, calendar 381, media player 382, album 383, clock 384, health care (for example, measure exercise quantity or blood sugar), or environment information (for example, atmospheric pressure, humidity, or temperature information).

According to an embodiment of the present disclosure, the applications 370 may include an application (hereinafter, referred to as an "information exchange application" for convenience of description) supporting information exchange between the electronic device (for example, the electronic device 101) and an external electronic device (for example, the electronic device 102 or 104). The information exchange application may include, for example, a notification relay application for transferring specific information to an external electronic device or a device management application for managing an external electronic device.

For example, the notification relay application may include a function of transferring, to the external electronic device (for example, the electronic device 102 or 104), notification information generated from other applications of the electronic device (for example, an SMS/MMS application, an e-mail application, a health management application, or an environmental information application). Further, the notification relay application can, for example, receive notification information from the external electronic device and provide the received notification information to a user.

The device management application may manage (for example, install, delete, or update), for example, at least one function of an external electronic device (for example, the electronic device 102 or 104) communicating with the electronic device (for example, a function of turning on/off the external electronic device itself (or some components) or a function of adjusting luminance (or a resolution) of the display), applications operating in the external electronic device, or services provided by the external electronic device (for example, a call service and a message service).

According to an embodiment of the present disclosure, the applications 370 may include applications (for example, a health care application of a mobile medical appliance or the like) designated according to attributes of the external electronic device 102 or 104. According to an embodiment of the present disclosure, the applications 370 may include an application received from the external electronic device (for example, the server 106, or the electronic device 102 or 104). According to an embodiment of the present disclosure, the application 370 may include a preloaded application or a third party application which can be downloaded from the server. Names of the elements of the program module 310, according to the above-described embodiments of the present disclosure, may change depending on the type of OS.

According to various embodiments of the present disclosure, at least some of the program module 310 may be implemented in software, firmware, hardware, or a combination of two or more thereof. At least some of the program module 310 may be implemented (e.g., executed) by, for example, the processor (e.g., the processor 210). At least some of the program module 310 may include, for example, a module, a program, a routine, a set of instructions, and/or a process for performing one or more functions.

Figure 4:
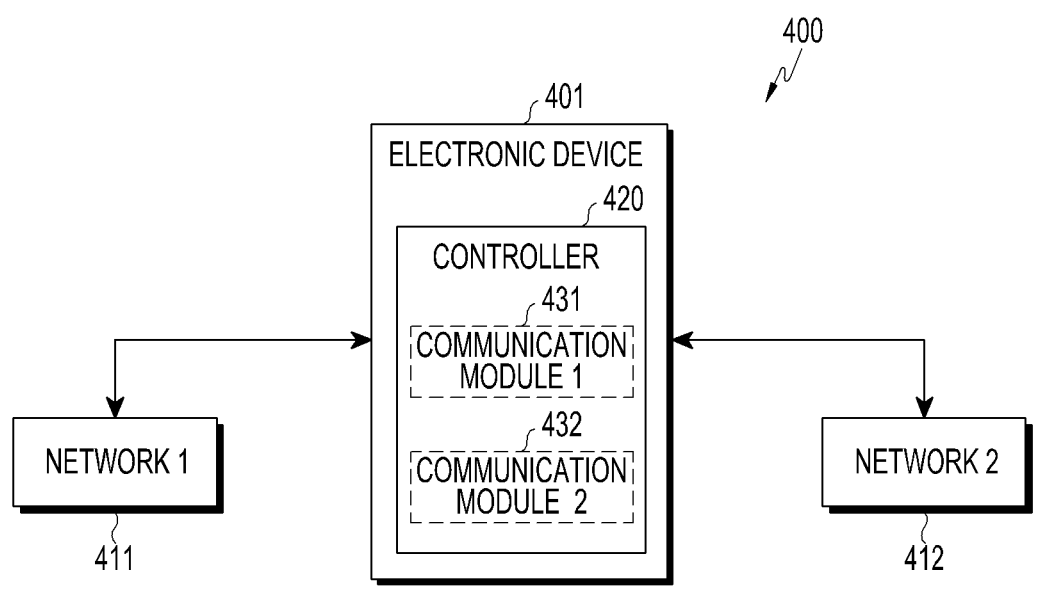
FIG. 4 is a diagram illustrating a communication system according to various embodiments of the present disclosure.

FIG. 4 is a diagram illustrating a communication system according to various embodiments of the present disclosure.

Referring to FIG. 4, a communication system 400 may include an electrical device 401 (for example, the electronic devices 101 and 201), a first network 411, and a second network 412.

For example, the first network 411 may include a LTE network and an IP multimedia subsystem (IMS). The IMS may also be included in the LTE network.

For example, the second network 412 may include universal mobile telephone system (UMTS) terrestrial radio access network (UTRAN), GSM/enhanced data rates for GSM evolution (EDGE) radio access network (GERAN), CDMA2000, CDMA 1x, or a network similar thereto.

The electronic device 401 may include a controller 420, and the controller 420 may include at least one of a first communication module 431 and a second communication module 432, or functionally connected at least one of the modules 431 and 432.

The first communication module 431 (e.g., at least one of the communication interface 170, the communication module 220, the cellular module 221, an LTE module, or the like) may perform communication with the first network 411 that provides a packet data (or internet protocol (IP2) based call service or an entity of the first network 411.

The second communication module 432 (e.g., at least one of the communication interface 170, the communication module 220, the cellular module 221, (CDMA 1x module, or the like) may perform communication with the second network 412 that provides a circuit switching-based call service or an entity of the second network 412.

In an embodiment of the present disclosure, the first communication module 431 and the second communication module 432 may be integrated into a single communication module.

The controller 420 may include one or a plurality of processors, and the processor may be separately provided from the first and second communication modules 431 and 432, or the processor is integrated with any one of the first and second communication modules 431 and 432, and the first and second communication modules 431 and 432 and two processors are integrated, respectively, or any one of the first and second communication modules 431 and 432 are integrated with the first processor, and the second processor may be separately provided from the first and second communication modules 431 and 432. For example, the processor may include at least one CP and/or at least one AP.

Figure 5:
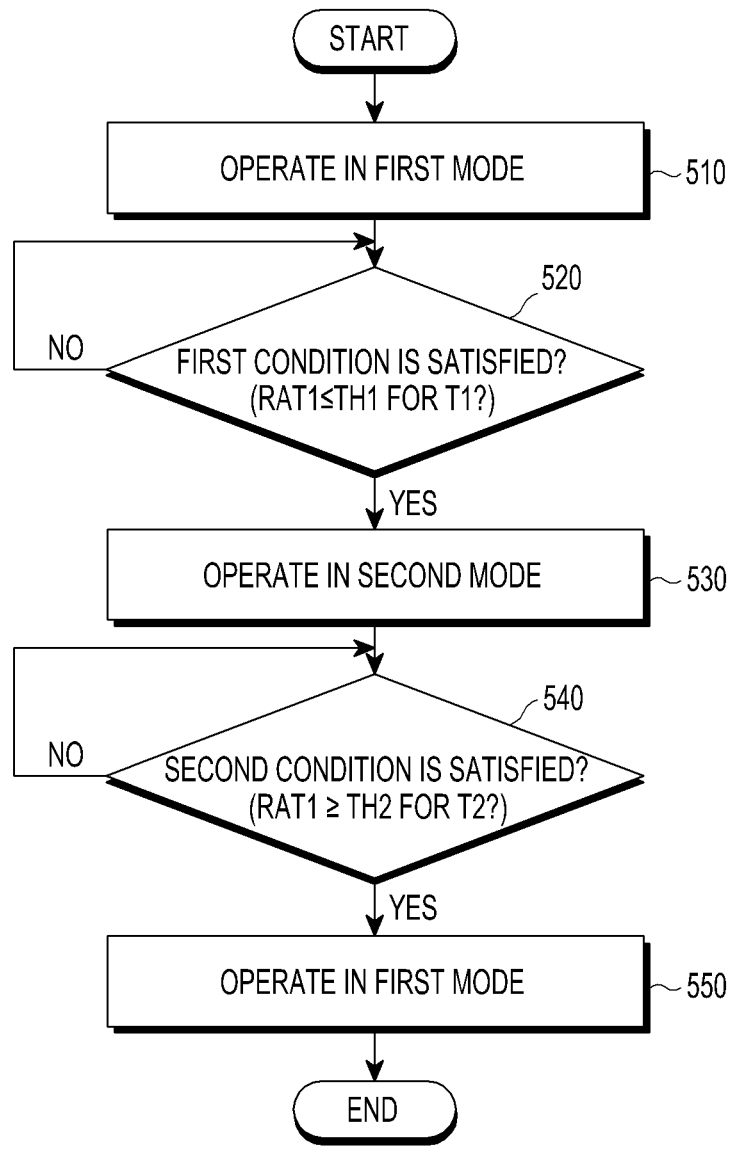
FIG. 5 is a flowchart illustrating a communication method of an electronic device according to various embodiments of the present disclosure.

FIG. 5 is a flowchart illustrating a communication method of an electronic device according to various embodiments of the present disclosure.

Referring to FIG. 5, a method for operating the electronic device may include operations 510 to 550. The method for operating the electronic device may be performed by at least one among an electronic device (for example, electronic devices 101, 201, and 401), a processor (for example, the processors 120 and 210) of the electronic device, a communication device (for example, the communication interface 170, the communication module 220, and the cellular module 221) of the electronic device, and a controller (for example, the controller 420) of the electronic device.

In operation 510, the electronic device may operate in a first mode. In the first mode, the electronic device may be configured to receive a call or transmit a call request (or a call setup request) through the first network that provides a packet data (or IP) based call service. Hereinafter, the call may be a voice call or a video call for a one-to-one call/conversation/communication or a one-to-multiple call/conversation/communication between the electronic device and the external electronic device(s).

According to an embodiment of the present disclosure, in the first mode, the electronic device may be registered to the first network in order to receive a call or transmit a call request (or a call setup request) through the first network.

According to an embodiment of the present disclosure, in the first mode, the electronic device is in a state of being registered only to the first network (i.e., a single registration state) among the first network and a second network for providing a circuit-switching based call service.

According to an embodiment of the present disclosure, in the first mode, the electronic device may receive a data service (e.g., transmission/reception of multimedia data (or file/message), a real-time communication service (e.g., video chatting, a video conference), Internet services, or the like through the first network.

In operation 520, the electronic device may determine whether a first predetermined condition is satisfied.

For example, a first predetermined condition may include at least one among the detection of a context associated with the electronic device that matches with a predetermined context, a case where the electronic device is located at or reaches a predetermined area/place, or a case where a value indicating the signal quality of the first network is included in a predetermined threshold range or more/less than the predetermined threshold value.

In an embodiment of the present disclosure, the electronic device may acquire a value (RAT1) indicating the signal quality of the first network, and compare the acquired value with a first predetermined threshold value (TH1).

In an embodiment of the present disclosure, the value indicating the signal quality of the first network may be at least one among a received signal strength indicator (RSSI) indicating a value of the power of a signal received by the electronic device, reference signal received power (RSRP) indicating a value of the power of the reference signal received by the electronic device, reference signal received quality (RSRQ) indicating a value of a ratio of the power of the reference signal to the power of the signal received by the electronic device, and a signal-to-interference-plus-noise ratio (SINR) indicating a value of a ratio of the power of the signal received by the electronic device to the sum of the noise power and the interference power.

When the first condition is satisfied (or if the acquired value is equal to or less than the first threshold value), the electronic device may perform operation 530 automatically or according to the user's selection, and when the first condition is not satisfied (or if the acquired value exceeds the first threshold value), the electronic device may periodically or non-periodically repeat the operation 520.

In an embodiment of the present disclosure, when a state in which the signal quality value of the first network is equal to or less than the first threshold value is maintained for a first predetermined threshold time (T1), the electronic device may be switched from the first mode to a second mode.

In operation 530, the electronic device may operate in the second mode. In the second mode, the electronic device may be configured to receive a call or transmit a call request (or call setup request) through the second network that provides a circuit-switching based call service.

In an embodiment of the present disclosure, when switching from the first mode to the second mode, the electronic device may transmit capability information representing 2nd generation (2G)/3rd generation (3G) capability to an access server (AS)/a network access server (NAS) of the first network or a mobility management entity (MME).

According to an embodiment of the present disclosure, in the second mode, the electronic device may be registered to the second network in order to receive a call or transmit a call request (or a call setup request) through the second network.

According to an embodiment of the present disclosure, in the second mode, the electronic device may be configured to receive a call or transmit a call request (or call setup request) through the second network in a state of maintaining the registration of the first network.

According to an embodiment of the present disclosure, in the second mode, the electronic device may be in a state of being registered to both of the first network and the second network (that is, a dual registration state).

According to an embodiment of the present disclosure, in the second mode, the electronic device may be provided with a data service through the first network.

In operation 540, the electronic device may determine whether a second predetermined condition is satisfied.

For example, a second predetermined condition may include at least one among the detection of a context associated with the electronic device that matches with a pre-determined context, a case where the electronic device is located at or reaches a predetermined area/place, or a case where a value indicating the signal quality of the first network is included in a predetermined threshold range or more/less than the predetermined threshold value.

According to an embodiment of the present disclosure, the electronic device may acquire a value (RAT1) indicating the signal quality of the first network, and compare the acquired value with a second threshold value (TH2).

When the second condition is satisfied (or if the acquired value is equal to or greater than the second threshold value), the electronic device may perform operation 550 automatically or according to the user's selection, and when the second condition is not satisfied (or if the acquired value is less than the second threshold value), the electronic device may periodically or non-periodically repeat the operation 540. In an embodiment of the present disclosure, when the second condition is not satisfied (or if the acquired value is less than the second threshold value), the electronic device may perform operation 520.

In an embodiment of the present disclosure, when a state in which the signal quality value of the first network is equal to or greater than the second threshold value is maintained for a second predetermined threshold time (T2), the electronic device may be switched from the second mode to the first mode.

In operation 550, the electronic device may operate in a first mode. In the first mode, the electronic device may be configured to receive a call or transmit a call request (or call setup request) through the first network.

Figure 6:
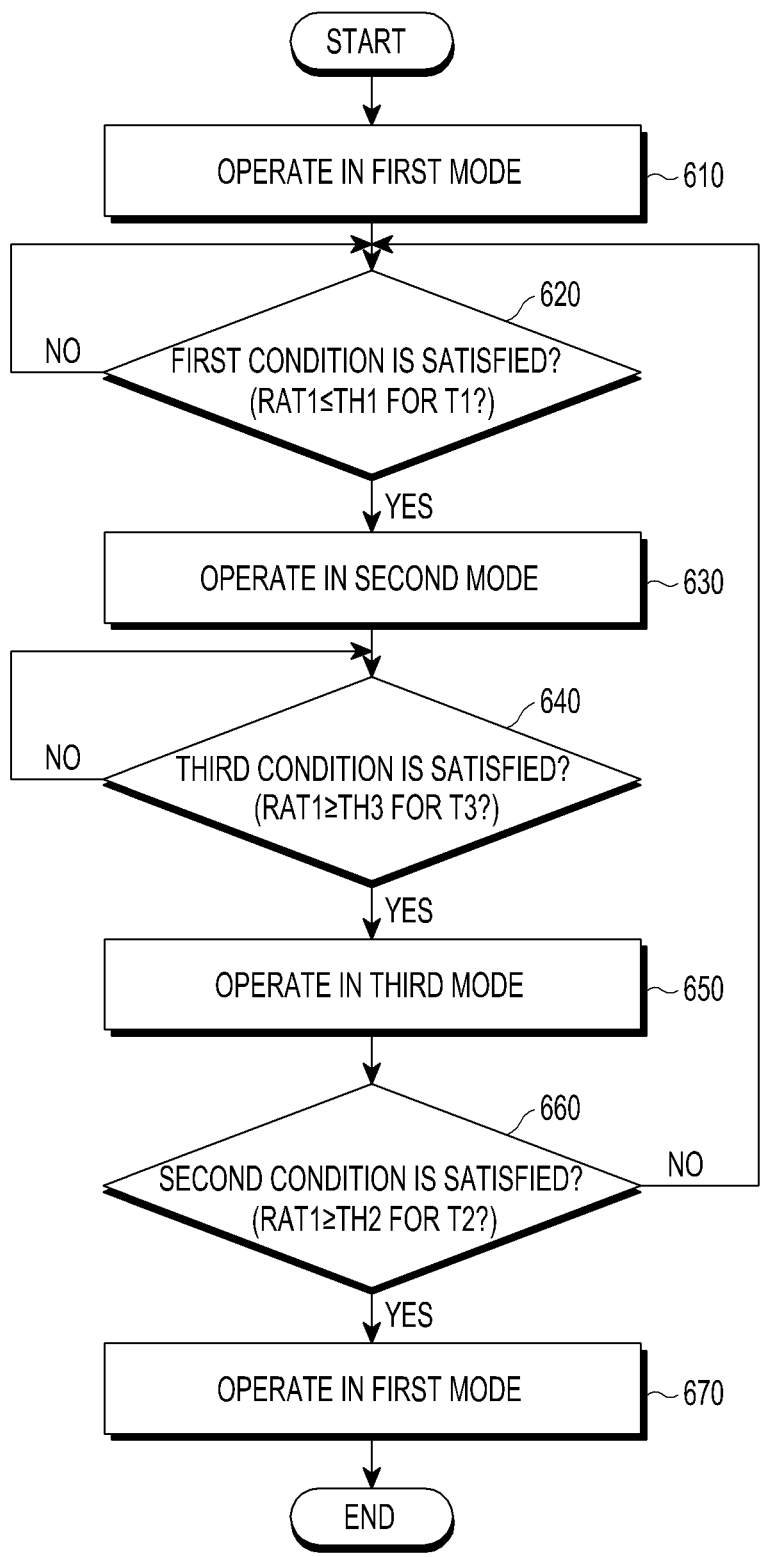
FIG. 6 is a flowchart illustrating a communication method of an electronic device according to various embodiments of the present disclosure.

FIG. 6 is a flowchart illustrating a communication method of an electronic device according to various embodiments of the present disclosure.

Referring to FIG. 6, a method for operating the electronic device may include operations 610 to 670. The method for operating the electronic device may be performed by at least one among an electronic device (for example, electronic devices 101, 201, and 401), a processor (for example, the processors 120 and 210) of the electronic device, a communication device (for example, the communication interface 170, the communication module 220, and the cellular module 221) of the electronic device, and a controller (for example, the controller 420) of the electronic device.

In operation 610, the electronic device may operate in a first mode. In the first mode, the electronic device may be configured to receive a call or transmit a call request (or call setup request) through the first network that provides a packet data (or IP) based call service.

According to an embodiment of the present disclosure, in the first mode, the electronic device may be registered to the first network in order to receive a call or transmit a call request (or a call setup request) through the first network.

According to an embodiment of the present disclosure, in the first mode, the electronic device is in a state of being registered only to the first network (i.e., a single registration state) among the first network and a second network for providing a circuit-switching based call service.

According to an embodiment of the present disclosure, in the first mode, the electronic device may receive a data service (e.g., the transmission/reception of multimedia data (or file/message), a real-time communication service (e.g., video chatting, a video conference), Internet services, or the like through the first network.

In operation 620, the electronic device may determine whether a first predetermined condition is satisfied.

In an embodiment of the present disclosure, the electronic device may acquire a value (RAT1) indicating the signal quality of the first network, and compare the acquired value with a first predetermined threshold value (TH1).

When the first condition is satisfied (or if the acquired value is equal to or less than the first threshold value), the electronic device may perform operation 630 automatically or according to the user's selection, and when the first condition is not satisfied (or if the acquired value exceeds the first threshold value), the electronic device may periodically or non-periodically repeat the operation 620.

In an embodiment of the present disclosure, when a state in which the signal quality value of the first network is equal to or less than the first threshold value is maintained for a first predetermined threshold time (T1), the electronic device may be switched from the first mode to the second mode.

In operation 630, the electronic device may operate in the second mode. In the second mode, the electronic device may be configured to receive a call or transmit a call request (or call setup request) through the second network that provides a circuit-switching based call service.

In an embodiment of the present disclosure, when switching from the first mode to the second mode, the electronic device may transmit capability information indicating 2G/3G capability to the AS/NAS or MME of the first network.

According to an embodiment of the present disclosure, in the second mode, the electronic device may be registered to the second network in order to receive a call or transmit a call request (or a call setup request) through the second network.

According to an embodiment of the present disclosure, in the second mode, the electronic device may be configured to receive a call or transmit a call request (or call setup request) through the second network in a state of maintaining the registration of the first network.

According to an embodiment of the present disclosure, in the second mode, the electronic device may be in a state of being registered to both of the first network and the second network (that is, a dual registration state).

According to an embodiment of the present disclosure, in the second mode, the electronic device may be provided with a data service through the first network.

In operation 640, the electronic device may determine whether a third predetermined condition is satisfied.

For example, the third predetermined condition may include at least one among the detection of a context associated with the electronic device that matches with a pre-determined context, a case where the electronic device is located at or reaches a predetermined area/place, or a case where a value indicating the signal quality of the first network is included in a predetermined threshold range or more/less than the predetermined threshold value.

In an embodiment of the present disclosure, the electronic device may acquire a value (RAT1) indicating the signal quality of the first network, and compare the acquired value with a third threshold value (TH3).

When the third condition is satisfied (or if the acquired value is equal to or greater than (or exceeds) the third threshold value), the electronic device may perform operation 650, and when the third condition is not satisfied (or if the acquired value is less than the third threshold value), the electronic device may periodically or non-periodically repeat the operation 640.

In an embodiment of the present disclosure, when a state in which the signal quality value of the first network is equal to or greater than (or exceeds) the third threshold value is maintained for a third predetermined threshold time (T3), the electronic device may be switched from the second mode to a third mode.

In an embodiment of the present disclosure, the third threshold value may be identical to the first threshold value.

In operation 650, the electronic device may operate in a third mode. In the third mode, the electronic device may be configured to receive a call or transmit a call request (or call setup request) through the first network.

According to an embodiment of the present disclosure, in the third mode, the electronic device may be in a state of being registered to both of the first network and the second network (that is, a dual registration state).

According to an embodiment of the present disclosure, in the third mode, the electronic device may be provided with a data service through the first network.

In operation 660, the electronic device may determine whether a second predetermined condition is satisfied.

In an embodiment of the present disclosure, the electronic device may acquire a value (RAT1) indicating the signal quality of the first network, and compare the acquired value with a second threshold value (TH2).

When the second condition is satisfied (or if the acquired value is equal to or greater than the second threshold value), the electronic device may perform operation 670 automatically or according to the user's selection, and when the second condition is not satisfied (or if the acquired value is less than the second threshold value), the electronic device may periodically or non-periodically repeat the operation 620 or the operation 660. In an embodiment of the present disclosure, when the second condition is not satisfied (or if the acquired value is less than the second threshold value), the electronic device may perform operation 620.

In an embodiment of the present disclosure, when a state in which the signal quality value of the first network is equal to or greater than the second threshold value is maintained for a second predetermined threshold time (T2), the electronic device may be switched from the third mode to the first mode.

In an embodiment of the present disclosure, when switching from the third mode to the first mode, the electronic device may transmit capability information representing 2G/3G incapability to the AS/NAS or MME of the first network.

In an embodiment of the present disclosure, when switching from the third mode to the first mode, the electronic device may deactivate the communication module (for example, the second communication module 432) activated for communication with the second network.

In operation 670, the electronic device may operate in the first mode. In the first mode, the electronic device may be configured to receive a call or transmit a call request (or call setup request) through the first network.

Figure 7:
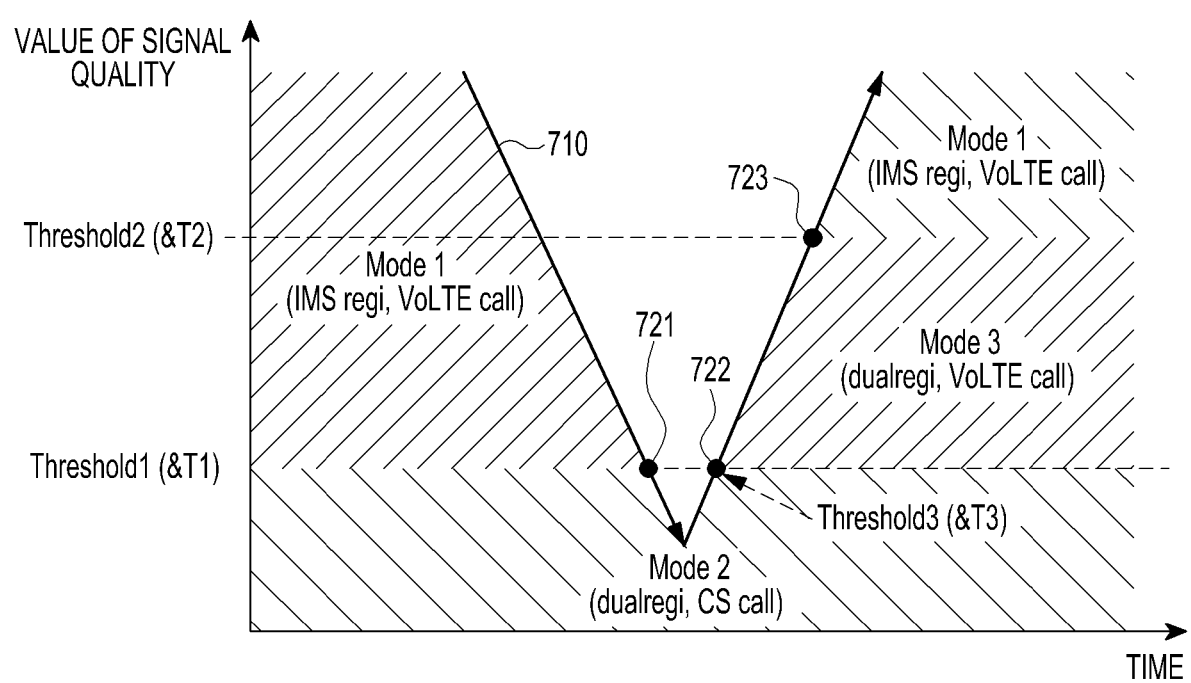
FIG. 7 is a diagram illustrating a communication method of an electronic device according to various embodiments of the present disclosure.

FIG. 7 is a diagram illustrating a communication method of an electronic device according to various embodiments of the present disclosure.

Referring to FIG. 7, a graph 710 shows the change of a value of the signal quality over time. For example, the signal quality value may be a value indicating the signal quality of the first network for providing a packet data (or IP) based call service.

In a time interval where the signal quality value exceeds the first predetermined threshold value 721 (Threshold1), an electronic device (for example, the electronic devices 101, 201, and 401) may operate in the first mode.

In the first mode, the electronic device may be configured to receive a call or transmit a call request (or call setup request) through the first network that provides a packet data (or IP) based call service.

According to an embodiment of the present disclosure, in the first mode, the electronic device may be registered to the first network in order to receive a call or transmit a call request (or a call setup request) through the first network.

According to an embodiment of the present disclosure, in the first mode, the electronic device is in a state of being registered only to the first network (i.e., a single registration state) among the first network and a second network for providing a circuit-switching based call service.

According to an embodiment of the present disclosure, in the first mode, the electronic device may be provided with a data service through the first network.

In a time interval where the signal quality value is equal to or less than the first predetermined threshold value 721 (Threshold1), the electronic device may operate in the second mode. In the second mode, the electronic device may be configured to receive a call or transmit a call request (or call setup request) through the second network that provides a circuit-switching based call service.

When the signal quality value of the first network is gradually reduced to become the first threshold value 721 or less, the electronic device may be switched from the first mode to the second mode.

In an embodiment of the present disclosure, when a state in which the signal quality value of the first network is equal to or less than the first threshold value 721 is maintained for a first predetermined threshold time (T1), the electronic device may be switched from the first mode to the second mode. For example, when a state where the RSRP is equal to less than −110 dBm and the SINR is less than 0 dB lasts 5 seconds, the electronic device may be switched from the first mode to the second mode.

In an embodiment of the present disclosure, when switching from the first mode to the second mode, the electronic device may transmit capability information representing 2G/3G capability to an AS/NAS of the first network or a MME.

According to an embodiment of the present disclosure, in the second mode, the electronic device may be registered to the second network in order to receive a call through the second network or transmit a call request (or a call setup request).

According to an embodiment of the present disclosure, in the second mode, the electronic device may be configured to receive a call or transmit a call request (or call setup request) through the second network in a state of maintaining the registration of the first network.

According to an embodiment of the present disclosure, in the second mode, the electronic device may be in a state of being registered to both the first network and the second network (that is, a dual registration state).

According to an embodiment of the present disclosure, in the second mode, the electronic device may be provided with a data service through the first network.

In a time interval where the signal quality value is less than a second predetermined threshold value 723 (Threshold2) and exceeds (or is greater than or equal to) a third predetermined threshold value 722 (Threshold3), the electronic device may operate in the third mode. In the third mode, the electronic device may be configured to receive a call or transmit a call request (or call setup request) through the first network.

In an embodiment of the present disclosure, the third threshold value may be identical to the first threshold value.

When the signal quality value of the first network is gradually increased to exceed (or is greater than or equal to) the third threshold value 722, the electronic device may be switched from the second mode to the third mode.

In an embodiment of the present disclosure, when a state in which the signal quality value of the first network exceeds the third threshold value 722 is maintained for a third predetermined threshold time (T3), the electronic device may be switched from the second mode to the third mode.

According to an embodiment of the present disclosure, in the third mode, the electronic device may be in a state of being registered to both of the first network and the second network (that is, a dual registration state).

According to an embodiment of the present disclosure, in the third mode, the electronic device may be provided with a data service through the first network.

In a time interval where the signal quality value is equal to or greater than the third threshold value 723 (Threshold3), the electronic device may operate in the first mode.

When the signal quality value of the first network is gradually increased to become the second threshold value 723 or more, the electronic device may be switched from the third mode to the first mode.

In an embodiment of the present disclosure, when a state where the signal quality value of the first network is equal to or greater than the second threshold value 723 is maintained during a second predetermined threshold time (T2), the electronic device may be switched from the third mode to the first mode.

In an embodiment of the present disclosure, when switching from the third mode to the first mode, the electronic device may transmit capability information indicating 2G/3G incapability to an AS/an NAS of the first network.

In an embodiment of the present disclosure, when switching from the third mode to the first mode, the electronic device may deactivate the communication module (for example, the second communication module 432) activated for communication with the second network.

At this time, the activated state (e.g., a power-on state, a normal mode state, or the like) may be a state of capable of transmitting and/or receiving data and/or signals, and the deactivated state (e.g., power-off state, a sleep mode state, or the like) may be a state of capable only of receiving data and/or signals (transmission is impossible) or a state where each of transmission and reception of the data and/or signals is not possible.

In an embodiment of the present disclosure, the electronic device may display a graphical element indicating a network being used in the corresponding mode on a display (for example, displays 160 and 260).

According to an embodiment of the present disclosure, in the second mode and/or third mode, the electronic device may select and provide one of a call service through the first network and a call service through the second network.

According to an embodiment of the present disclosure, in the second mode and/or third mode, the electronic device may provide a user interface in which one of the call service through the first network and the call service through the second network can be selected. The electronic device may provide a call service through a selected network in response to the user selection through the user interface.

In the second mode and/or third mode, the electronic device may perform an operation associated with the second network, such as periodically monitoring or measuring a paging signal of the second network, and the operation may affect the performance of an evolved multimedia broadcast and multicast service (eMBMS).

According to an embodiment of the present disclosure, in the second mode and/or third mode, while providing the eMBMS service, the electronic device may be configured not to perform an operation associated with the second network, such as monitoring or measuring a paging signal of the second network, and may be configured to monitor only a paging signal of the first network. After terminating the eMBMS service, the electronic device may be configured to enable the call service through the second network by performing an operation associated with the second network, such as monitoring or measuring the paging signal of the second network.

Figure 8:
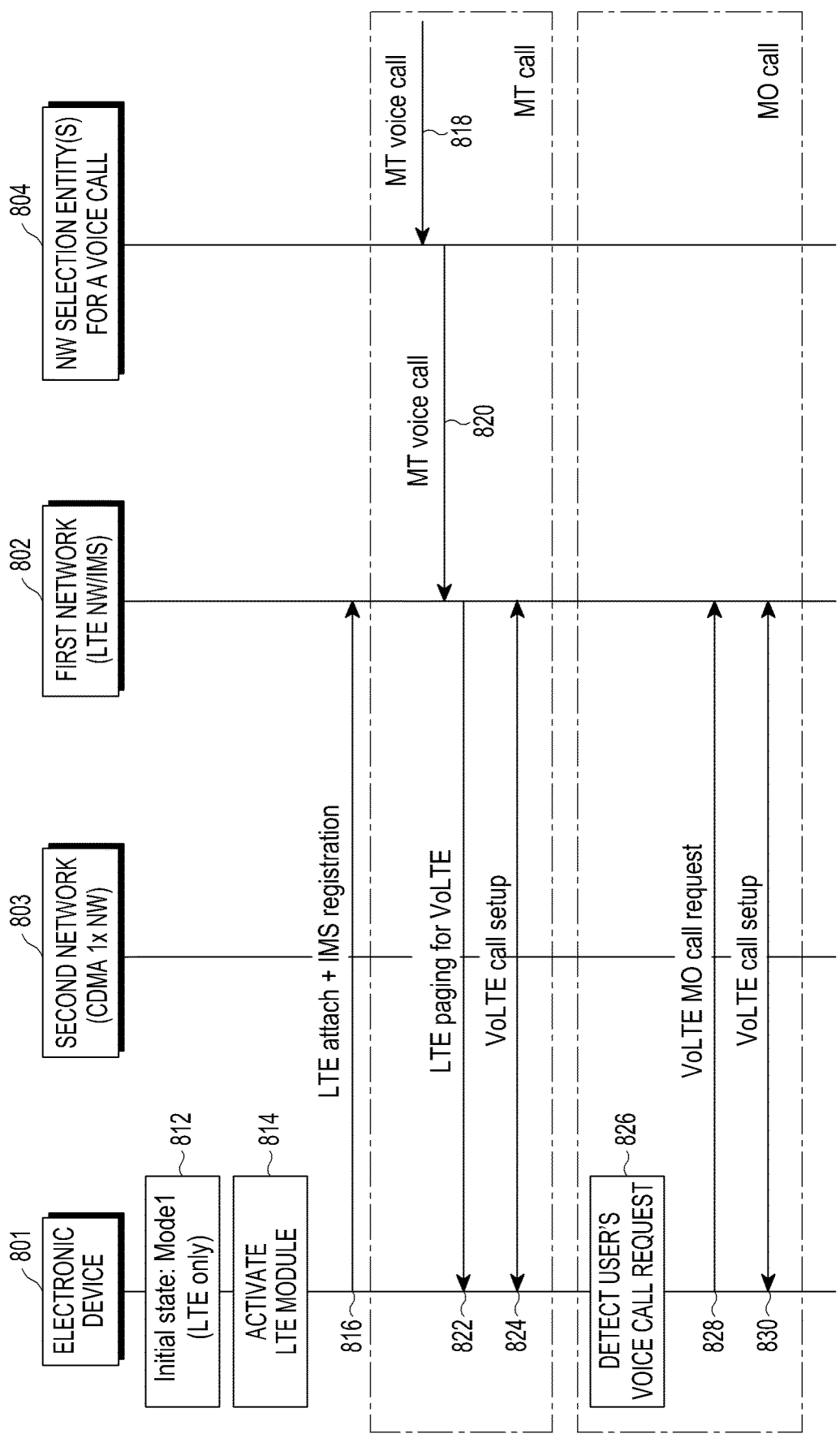
FIG. 8 is a flowchart illustrating a communication method of a communication system according to various embodiments of the present disclosure.

FIG. 8 is a flowchart illustrating a communication method of a communication system according to various embodiments of the present disclosure.

Referring to FIG. 8, the communication system may include an electronic device 801 (for example, the electronic devices 101, 201, and 401), a first network 802 that provides a packet data (or IP) based call service, a second network 803 that provides a circuit-switching based call service, and network (NW) selection entity(s) 804 for a voice call.

For example, the first network 802 may include an LTE network and an IMS. The IMS may also be included in the LTE network.

The first network 802 may provide an IMS-based VoLTE call service in a packet switched (PS) method.

For example, the LTE network may be an LTE-A network.

For example, the LTE network may be used with the same meaning as the evolved UTRAN and enhanced universal mobile telecommunications system (UMTS) terrestrial radio access network (E-UTRAN).

For example, the LTE network may include at least one network entity, such as a base station (e.g., enhanced node B (eNB)), an MME, a serving gateway (S-GW), a packet data network gateway (PDN Gateway (P-GW)), or the like.

For instance, the eNB is a radio access network (RAN) node and may correspond to a radio network controller (RNC) of the UTRAN system and a base station controller ((BSC), hereafter referred to as "BSC") of GSM/enhanced data rates for GSM evolution (EDGE) radio access network (GERAN, hereinafter referred to as "GERAN") system. The eNB may be connected to the electronic device 801 through a wireless channel and may perform the role similar to the existing RNC/BSC.

The MME is an entity that is responsible for various control functions, and a single MME may be connected to multiple base stations.

The S-GW is a device that provides a data bearer and may generate or remove the data bearer under a control of the MME.

The P-GW may provide the connectivity of the S-GW and the external PDN.

The IMS may include a Proxy-call session control function enhanced for WebRTC (eP-CSCF) that transmits a message or data received from an electronic device 801 to an interrogating call session control function (I-CSCF) or a serving CSCF (S-CSCF), or the like, the I-CSCF that executes routing of a received message or data to the S-CSCF, the S-CSCF that registers an electronic device, executes routing of a message received from a PDN or a 3GPP/3GPP2 CS network to an eP-CSCF (or an electronic device 801), executes routing of a message received from an eP-CSCF (or an electronic device 801) to a PDN or a 3GPP/3GPP2 CS network, or the like, and an IMS access gateway enhanced for WebRTC (eIMS-AGW) that executes transcoding or the like.

For example, the second network 803 may include UTRAN, GSM/GERAN, CDMA2000, CDMA 1x, or a network similar thereto. The second network 803 may be referred to as a circuit switched (CS) network, 3rd Generation Partnership Project (3GPP)/3rd Generation Partnership Project 2 (3GPP2)) CS network, or a legacy network. In addition, the second network 803 may include a time division synchronous code division multiple access (TD-SCDMA) network, and the TD-SCMDA network may be generally classified as a 3G network.

For example, the second network 803 may include at least one network entity such as BTS (or NB), MSC, or the like.

The base-station transceiver subsystem (BTS) may perform a function of connecting a switchboard of the CS network and the electronic device 801, and perform functions such as wireless connection with the electronic device 801, synchronization maintenance, and a communication channel assignment/release to/from the electronic device 801.

A mobile switching center (MSC) may perform a function of connecting a public switching telephone network to a mobile communication network, and the MSC is located at the center of the mobile communication network to perform a function of configuring voice and non-voice communication paths by matching the BTS and a home location register, and may perform a function of operation and maintenance of the switchboard.

The NW selection entity (entities) 804 may include at least one network entity such as a gateway, a home subscriber server (HSS), a home location register (HLR), and/or the like.

Operations of the electronic device 801 may be performed by at least one among an electronic device (for example, electronic devices 101, 201, and 401), a processor (for example, the processors 120 and 210) of the electronic device, a communication device (for example, the communication interface 170, the communication module 220, and the cellular module 221) of the electronic device, and a controller (for example, the controller 420) of the electronic device.

In operation 812, the electronic device 801 may be configured to be in a first mode at the beginning. In the first mode, the electronic device may be configured to receive a call or transmit a call request (or call setup request) through the first network 802 (for example, LTE NW/IMS) that provides a packet data (or IP) based call service.

In the first mode, the electronic device 801 may be registered only to the first network 802 (i.e., a single registration state) among the first network 802 and the second network 803.

In the first mode, the electronic device may be provided with a data service through the first network 802.

In operation 814, the electronic device 801 may activate the LTE module (for example, the first communication module 431) in order to operate in the first mode.

In operation 816, the electronic device 801 may perform a procedure of being registered to the first network 802. For example, the electronic device 801 may perform a tracking area update (TAU) procedure or an attach procedure for registering the electronic device 801 to the LTE network. For example, the electronic device 801 may transmit a attach request message or a TAU request message to the MME. For example, the attach request message or the TAU request message may include at least one among identification information on the electronic device 801 (or elements), identification information on the LTE module, user identification information, or the like.

For example, the electronic device 801 may perform an IMS registration procedure for registering the electronic device 801 to the IMS. For example, the electronic device 801 may transmit a registration request message to an S-CSCF.

In operation 818, the NW selection entity (entities) 804 may receive a mobile terminating (MT) voice call from the external network.

In operation 820, the NW selection entity (entities) 804 may transmit the received MT voice call to the first network 802.

In operation 822, the first network 802 may transmit a paging signal for VoLTE to the electronic device 801 in response to the reception of the MT voice call.

In operation 824, since the electronic device 801 receives the paging signal, VoLTE call setup between the first network 802 (or an electronic device of the call originator) and the electronic device 801 may be established. After the VoLTE call setup has been established, the electronic device 801 can perform a one-to-one call/conversation/communication or a one-to-multiple call/conversation/communication with the electronic device.

In operation 826, the electronic device 801 may detect (or receive) a user's voice call request.

In operation 828, the electronic device 801 may transmit a VoLTE MO (Mobile Originating) call request message to the first network 802 in response to the detection (or reception) of the voice call request.

In operation 830, VoLTE call setup between the first network 802 (or an electronic device of the call recipient) and the electronic device 801 may be established. After the VoLTE call setup has been established, the electronic device 801 can perform a one-to-one call/conversation/communication or a one-to-multiple call/conversation/communication with the electronic device.

Figure 9A:
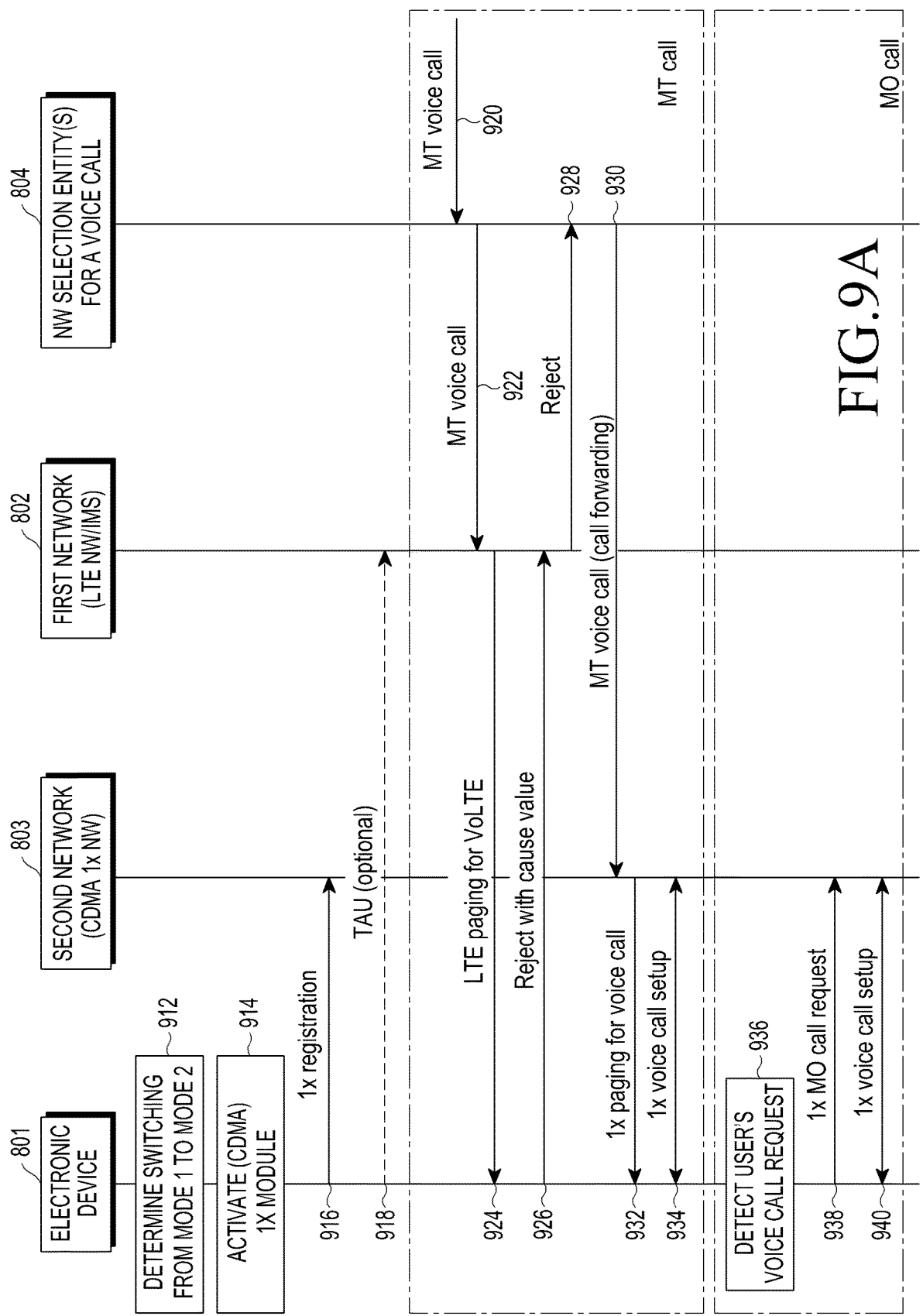

FIG. 9A is a flowchart illustrating a communication method of a communication system according to various embodiments of the present disclosure.

Referring to FIG. 9A, in operation 912, the electronic device 801 may determine switching from a first mode to a second mode.

In the first mode, the electronic device may be configured to receive a call or transmit a call request (or call setup request) through the first network 802 (for example, an LTE network) that provides a packet data (or IP) based call service.

In the first mode, the electronic device 801 may be registered only to the first network 802 (i.e., a single registration state) among the first network 802 and the second network 803.

In the first mode, the electronic device 801 may be provided with a data service through the first network 802.

In the second mode, the electronic device may be configured to receive a call or transmit a call request (or call setup request) through the second network 803 (for example, CDMA 1× network) that provides a circuit-switching based call service.

In the second mode, the electronic device may be in a state of being registered to both of the first network 802 and the second network 803 (that is, dual registration state).

In the second mode, the electronic device 801 may be provided with a data service through the first network 802.

In operation 914, the electronic device 801 may activate a CS module (for example, CDMA 1× module and the second communication module 432) in order to operate in the second mode.

In operation 916, the electronic device 801 may perform a procedure of being registered to the second network 803. For example, the electronic device 801 may perform an attach procedure or a location area update procedure for being registered to the CS network (for example, CDMA 1× network). For example, the electronic device 801 may transmit an attach request message or a location area update request message to the CS network (for example, CDMA 1× network). The attach request message or the location area update request message may include at least one among identification information on the electronic device 801 (or elements), identification information on the CS module, user identification information, or the like.

In operation 918, the electronic device 801 may transmit a TAU request message including capability information representing 2G/3G capability to an AS/NAS or MME of the first network 802.

In operation 920, the NW selection entity (entities) 804 may receive a MT voice call from the external network.

In operation 922, the NW selection entity (entities) 804 may transmit the received MT voice call to the first network 802.

In operation 924, the first network 802 may transmit a paging signal for VoLTE to the electronic device 801 in response to the reception of the MT voice call.

In operation 926, in response to the paging signal, the electronic device 801 may transmit a rejection message including a cause value to the first network 802 so that the MT voice call can be forwarded through the second said network 803. For example, the cause value may have a value indicating that forwarding is required.

In operation 928, the first network 802 may transmit the received rejection message to the NW selection entity (entities) 804.

In operation 930, the NW selection entity (entities) 804 may transmit the MT voice call through call forwarding to the second network 803 in response to the rejection message.

In operation 932, the second network 803 may transmit a paging signal for a CS call (for example, CDMA 1× call) to the electronic device 801 in response to the reception of the MT voice call.

In operation 934, since the electronic device 801 receives the paging signal, CS call setup (for example, CDMA 1× call setup) between the second network 803 (or an electronic device of the call originator) and the electronic device 801 may be established. After the CS call setup has been established, the electronic device 801 can perform a one-to-one call/conversation/communication or a one-to-multiple call/conversation/communication with the electronic device.

In operation 936, the electronic device 801 may detect (or receive) a user's voice call request.

In operation 938, the electronic device 801 may transmit a CS call request message (for example, CDMA 1×MO (Mobile Originating) call request message) to the second network 803 in response to the detection (or reception) of the voice call request.

In operation 940, a CS call setup (for example, CDMA 1× call setup) between the second network 803 (or an electronic device of the call recipient) and the electronic device 801 may be established. After the CS call setup has been established, the electronic device 801 can perform a oneto-one call/conversation/communication or a one-to-multiple call/conversation/communication with the electronic device.

FIG. 9B is a flowchart illustrating a communication method of a communication system according to various embodiments of the present disclosure.

Referring to FIG. 9B, in operation 912, the electronic device 801 may determine switching from a first mode to a second mode.

In the first mode, the electronic device 801 may be configured to receive a call or transmit a call request (or call setup request) through the first network 802 (for example, an LTE network) that provides a packet data (or IP) based call service.

In the first mode, the electronic device 801 may be registered only to the first network 802 (i.e., a single registration state) among the first network 802 and the second network 803.

In the first mode, the electronic device 801 may be provided with a data service through the first network 802.

In the second mode, the electronic device may be configured to receive a call or transmit a call request (or call setup request) through the second network 803 (for example, CDMA 1× network) that provides a circuit-switching based call service.

In the second mode, the electronic device may be in a state of being registered to both of the first network 802 and the second network 803 (that is, dual registration state).

In the second mode, the electronic device 801 may be provided with a data service through the first network 802.

In operation 914, the electronic device 801 may activate a CS module (for example, CDMA 1× module and the second communication module 432) in order to operate in the second mode.

In operation 916, the electronic device 801 may perform a procedure of registering the electronic device 801 to the second network 803. For example, the electronic device 801 may perform or a location area update procedure or an attach procedure for registering the electronic device 801 to the CS network (for example, CDMA 1× network). For example, the electronic device 801 may transmit an attach request message or a location area update request message to the CS network (for example, CDMA 1× network). The attach request message or the location area update request message may include at least one among identification information on the electronic device 801 (or elements), identification information on the CS module, user identification information, or the like.

In operation 918, the electronic device 801 may transmit a TAU request message including capability information representing 2G/3G capability to an AS/NAS or MME of the first network.

In operation 920, the NW selection entity (entities) 804 may receive a MT voice call from the external network.

In operation 922, the NW selection entity (entities) 804 may transmit the received MT voice call to the first network 802.

In operation 924, the first network 802 may transmit a paging signal for VoLTE to the electronic device 801 in response to the reception of the MT voice call.

In operation 929, the NW selection entity (entities) 804 may wait for a response (for example, a rejection message) from the electronic device 801 or the first network 802 during a predetermined threshold time (T) after transmitting the received MT voice call to the first network 802. When the threshold T expires, the NW selection entity (entities) 804 may immediately perform a call forwarding operation to the second network 803.

When receiving the response before the threshold T expires, the NW selection entity (entities) 804 may immediately perform a call forwarding operation to the second network 803 without waiting for the threshold T to expire. For example, the electronic device 801 may not transmit the response due to a reason that it does not receive the paging signal for VoLTE from the first network 802 or a reason of network errors, or the like even though it received the paging signal. For such a case, the NW selection entity (entities) 804 sets the threshold T, and when the threshold T expires even though the response is not received, the NW selection entity (entities) 804 may perform a call forwarding operation to the second network 803.

In operation 930, the NW selection entity (entities) 804 may transmit the MT voice call through call forwarding to the second network 803 in response to expiration of the threshold T.

In operation 932, the second network 803 may transmit a paging signal for a CS call (for example, CDMA 1× call) to the electronic device 801 in response to the reception of the MT voice call.

In operation 934, since the electronic device 801 receives the paging signal, a CS call setup (for example, CDMA 1× call setup) between the second network 803 (or an electronic device of the call originator) and the electronic device 801 may be established.

In operation 936, the electronic device 801 may detect (or receive) a user's voice call request.

In operation 938, the electronic device 801 may transmit a CS call request message (for example, CDMA 1×MO (Mobile Originating) call request message) to the second network 803 in response to the detection (or reception) of the voice call request.

In operation 940, a CS call setup (for example, CDMA 1× call setup) between the second network 803 (or an electronic device of the call recipient) and the electronic device 801 may be established.

Figure 10:
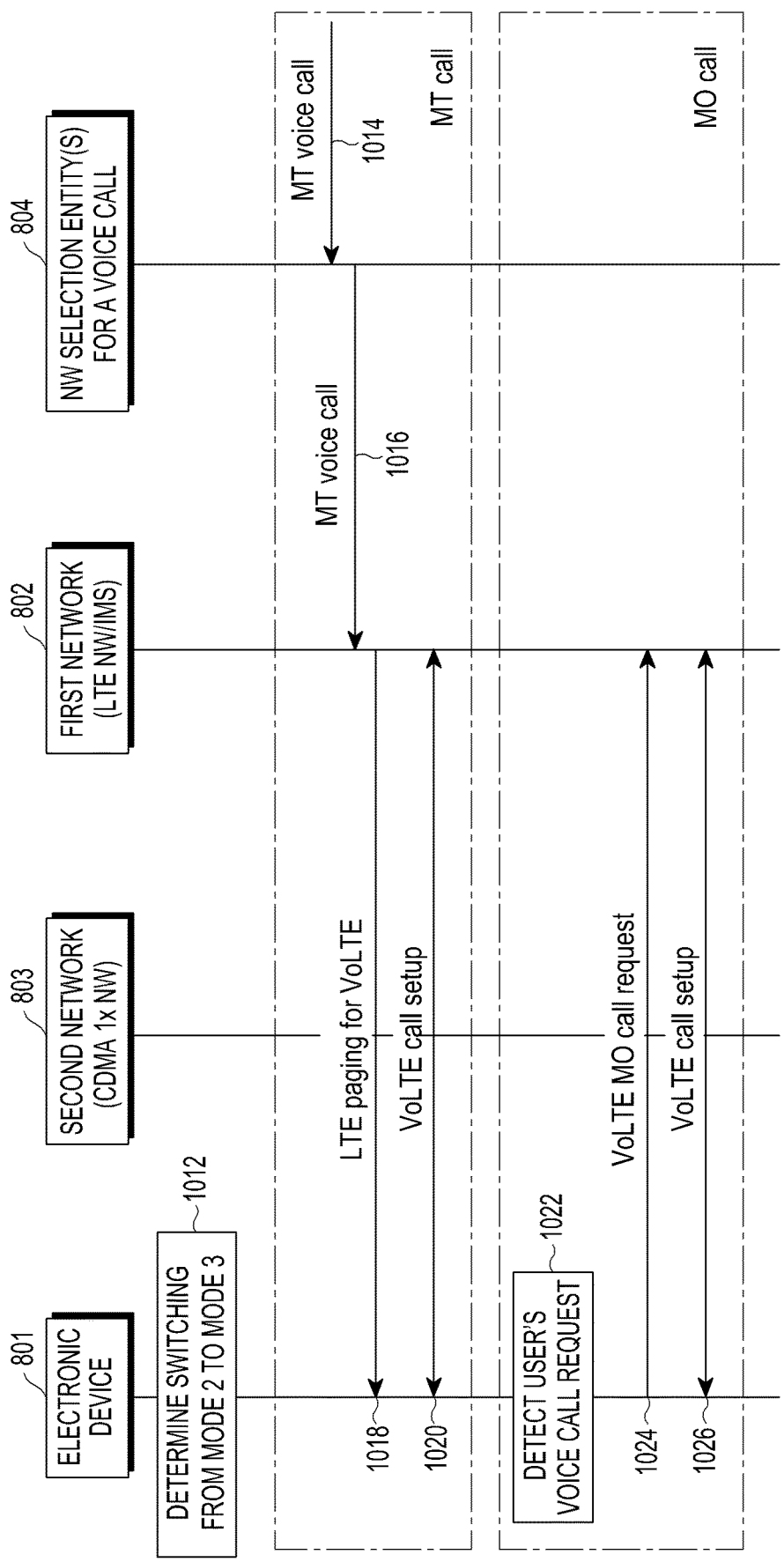
FIG. 10 is a flowchart illustrating a communication method of a communication system according to various embodiments of the present disclosure.

FIG. 10 is a flowchart illustrating a communication method of a communication system according to various embodiments of the present disclosure.

Referring to FIG. 10, in operation 1012, the electronic device 801 may determine switching from a second mode to a third mode.

In the second mode, the electronic device 801 may be configured to receive a call or transmit a call request (or call setup request) through the second network 803 (for example, CDMA 1× network) that provides a circuit-switching based call service.

In the second mode, the electronic device 801 may be in a state of being registered to both of the first network 802 and the second network 803 (that is, dual registration state).

In the second mode, the electronic device 801 may be provided with a data service through the first network 802.

In the third mode, the electronic device 801 may be configured to receive a call or transmit a call request (or call setup request) through the first network 802 (for example, an LTE network) that provides a packet data (or IP) based call service.

In the third mode, the electronic device 801 may be in a state of being registered to both of the first network 802 and the second network 803 (that is, dual registration state).

In the third mode, the electronic device 801 may be provided with a data service through the first network 802.

In operation 1014, the NW selection entity (entities) 804 may receive a MT voice call from the external network.

In operation 1016, the NW selection entity (entities) 804 may transmit the received MT voice call to the first network 802.

In operation 1018, the first network 802 may transmit a paging signal for VoLTE to the electronic device 801 in response to reception of the MT voice call.

In operation 1020, since the electronic device 801 receives the paging signal, a VoLTE call setup between the first network 802 (or an electronic device of the call originator) and the electronic device 801 may be established.

In operation 1022, the electronic device 801 may detect (or receive) a user's voice call request.

In operation 1024, the electronic device 801 may transmit a VoLTE mobile originating (MO) call request message to the first network 802 in response to the detection (or reception) of the voice call request.

In operation 1026, a VoLTE call setup between the first network 802 (or an electronic device of the call recipient) and the electronic device 801 may be established.

Figure 11:
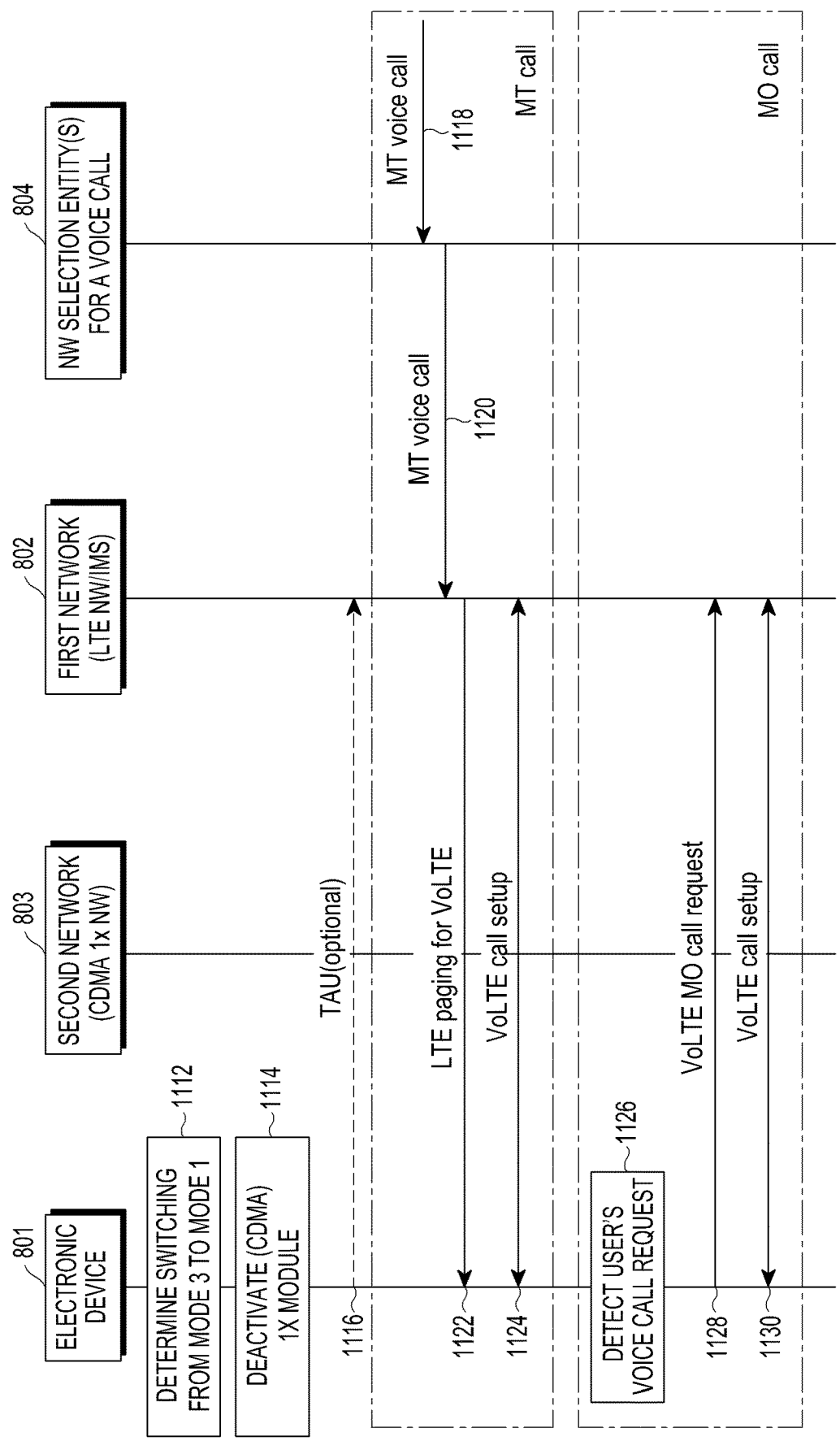
FIG. 11 is a flowchart illustrating a communication method of a communication system according to various embodiments of the present disclosure.

FIG. 11 is a flowchart illustrating a communication method of a communication system according to various embodiments of the present disclosure.

Referring to FIG. 11, in operation 1112, the electronic device 801 may determine switching from a third mode to a first mode.

In the third mode, the electronic device 801 may be configured to receive a call or transmit a call request (or call setup request) through the first network 802 (for example, an LTE network/IMS) that provides a packet data (or IP) based call service.

In the third mode, the electronic device 801 may be in a state of being registered to both of the first network 802 and the second network 803 (for example, CDMA 1× network) that provides a circuit-switching based call service (that is, dual registration state).

In the third mode, the electronic device 801 may be provided with a data service through the first network 802.

In the first mode, the electronic device may be configured to receive a call or transmit a call request (or call setup request) through the first network 802 (for example, an LTE network) that provides a packet data (or IP) based call service.

In the first mode, the electronic device 801 may be registered only to the first network 802 (i.e., a single registration state) among the first network 802 and the second network 803.

In the first mode, the electronic device 801 may be provided with a data service through the first network 802.

In operation 1114, the electronic device 801 may deactivate a CS module (for example, CDMA 1× module and the second communication module 432).

In operation 1116, the electronic device 801 may transmit a TAU request message including capability information representing 2G/3G capability to an AS/NAS or MME of the first network.

In operation 1118, the NW selection entity (entities) 804 may receive a MT voice call from the external network.

In operation 1120, the NW selection entity (entities) 804 may transmit the received MT voice call to the first network 802.

In operation 1122, the first network 802 may transmit a paging signal for VoLTE to the electronic device 801 in response to reception of the MT voice call.

In operation 1124, since the electronic device 801 receives the paging signal, a VoLTE call setup between the first network 802 (or an electronic device of the call originator) and the electronic device 801 may be established.

In operation 1126, the electronic device 801 may detect (or receive) a user's voice call request.

In operation 1128, the electronic device 801 may transmit a VoLTE MO (Mobile Originating) call request message to the first network 802 in response to the detection (or reception) of the voice call request.

In operation 1030, a VoLTE call setup between the first network 802 (or an electronic device of the call recipient) and the electronic device 801 may be established.

Figure 12C:
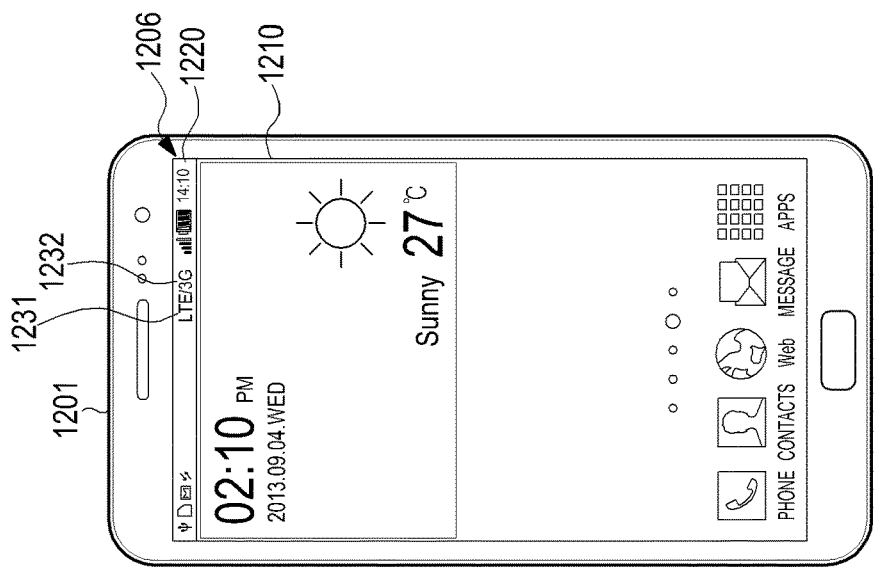
FIGS. 12A to 12C are diagrams illustrating an operation method of an electronic device according to various embodiments of the present disclosure.
Figure 12B:
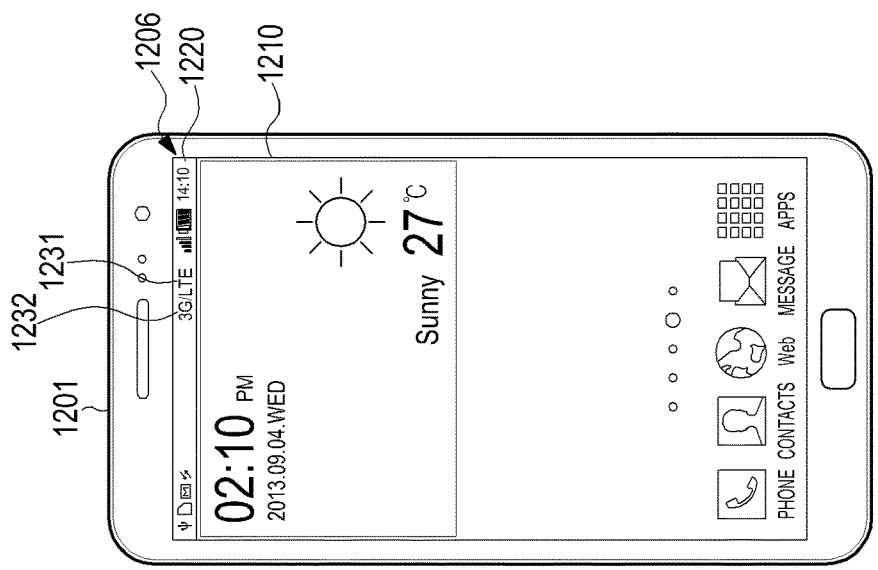
Figure 12A:
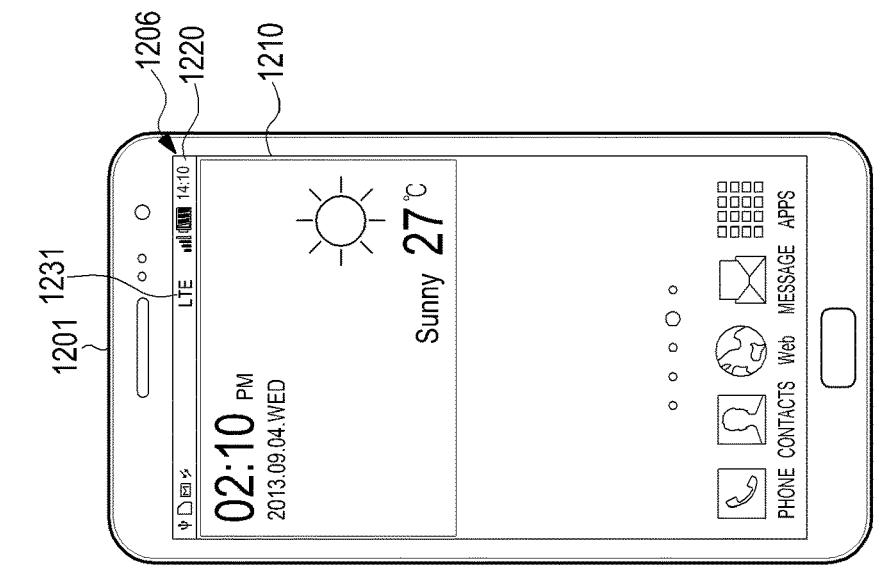

FIGS. 12A to 12C are diagrams illustrating an operation method of an electronic device according to an embodiment of the present disclosure.

Referring to FIG. 12A, an electronic device 1201 (for example, the electronic devices 101, 201, and 401) may operate in a first mode. In the first mode, the electronic device 1201 may be configured to receive a call or transmit a call request (or call setup request) through the first network that provides a packet data (or IP) based call service.

The electronic device 1201 may display, on the display 1206 (for example, the displays 160 and 260, at least one graphical element 1231 indicating an operation in a first mode or indicating the first network to be used during a call service. For example, the electronic device 1201 may display a first graphic element 1231 on a status bar 1220 at a top portion of a home screen 1210. The first graphic element 1231 may include at least one of images, icons, text, items, or the like that may identify the first network to be used during a voice call service. For example, the first graphic element 1231 may display the "LTE".

Referring to FIG. 12B, the electronic device 1201 may operate in a second mode. In the second mode, the electronic device 1201 may be configured to receive a call or transmit a call request (or call setup request) through the second network that provides a circuit-switching based call service.

The electronic device 1201 may display, on the display 1206, one or more graphical elements 1231 and 1232 indicating an operation in a second mode or indicating the second network to be used during a call service. For example, the electronic device 1201 may display a second graphic element 1232 on the status bar 1220 at a top portion of the home screen 1210. The second graphic element 1232 may include at least one of images, icons, text, items, or the like that may identify the second network to be used during a voice call service. For example, the second graphic element 1232 may display the "3G".

In the second mode, the electronic device 1201 may select and provide one of the call service through the first network and the call service through the second network.

In an embodiment of the present disclosure, the electronic device 1201 may display the first graphic element 1231 and the second graphical element 1232 on the display 1206. For example, the electronic device 1201 may make an emphasized display of the second graphic element 1232 (for example, the provision of emphasis through preferential arrangement, adjustment of color/shape/transparency/brightness/size, or the like, of an emphasis/effect (example) through blinking, underlined expression, bold expression, or the like) to indicate that the second network is preferentially used upon voice call service. For example, the electronic device 1201 may display the graphic elements 1231 and 1232 in the order of the first graphic element 1231 and the second graphical element 1232.

Referring to FIG. 12C, the electronic device 1201 may operate in a third mode. In the third mode, the electronic device may be configured to receive a call or transmit a call request (or call setup request) through the first network.

The electronic device 1201 may display, on the display 1206, one or more graphical elements 1231 and 1232 indicating an operation in a third mode or indicating the first network to be used during a call service. For example, the electronic device 1201 may display the first graphic element 1231 on the status bar 1220 at a top portion of the home screen 1210.

In the third mode, the electronic device 1201 may select and provide one of the call service through the first network and the call service through the second network.

In an embodiment of the present disclosure, the electronic device 1201 may display the first graphic element 1231 and the second graphical element 1232 on the display 1206. For example, the electronic device 1201 may make an emphasized display of the first graphic element 1231 (for example, the provision of emphasis through preferential arrangement, adjustment of color/shape/transparency/brightness/size, or the like, of an emphasis/effect (example) through blinking, underlined expression, bold expression, or the like) to indicate that the first network is preferentially used upon voice call service. For example, the electronic device 1201 may display the graphic elements 1231 and 1232 in the order of the first graphic element 1231 and the second graphical element 1232.

FIGS. 13A and 13B are diagrams illustrating an operation method of an electronic device according to various embodiments of the present disclosure.

Referring to FIGS. 13A and 13B, an electronic device 1301 (for example, the electronic devices 101, 201, and 401) may operate in a second or third mode. In the second and third mode, the electronic device 1201 may be configured to transmit a call request (or call setup request) through one selected from a first network that provides a packet data (or IP) based call service and a second network that provides a circuit-switching based call service.

Referring to FIG. 13A, a contacts screen 1310 (or a call log screen) of a phone application is displayed on the display 1306 (such as a display 160, 260) of the electronic device 1301, and the contacts screen 1310 may include a plurality of contacts 1320.

A first screen part 1322 for receiving an input for communication may correspond to the entirety or part of the contacts screen 1310. For example, the first screen part 1322 may be a call icon.

When detecting a user selection 1330 of any of the contacts 1320 from the contacts screen 1310 shown in FIG. 13A, the electronic device 1301 may display a second display part 1340 for designating one of the first network and the second network as shown in FIG. 13B. The second display part 1340 may include a first graphical element 1341 (e.g., LTE, or the like) corresponding to the first network and a second graphical element 1342 (e.g., 3G, or the like) corresponding to the second network. The first and second graphical elements 1341 and 1342 may include at least one of images, icons, text, items, or the like, respectively. The first and second graphical elements 1341 and 1342 may be individually selectable.

The user may select one of the first and second graphical elements 1341 and 1342 so as to designate a desired network. For example, when detecting a user selection 1332 of the first graphical element 1341, the electronic device 1301 may transmit a call request (or call setup request) to the first network.

For another example, when detecting a user selection of the second graphical element 1342, the electronic device 1301 may transmit a call request (or call setup request) to the second network.

According to various embodiments of the present disclosure, a method for communicating by an electronic device may include acquiring a value indicating the signal quality of a first network that provides a packet data (or IP) based call service, when the acquired value satisfies a first condition, receiving a call or transmitting a call request (or call setup request) through a second network that provides a circuit-switching based call service, and when the acquired value satisfies a second condition, receiving a call or transmitting a call request through the first network.

According to various embodiments of the present disclosure, the first condition may be a condition in which the acquired value is equal to or less than a first threshold value, and the second condition may be a condition in which the acquired value is equal to or greater than the second threshold value.

According to various embodiments of the present disclosure, when the condition in which the acquired value satisfies the first condition is maintained for a first threshold time, a call may be received or a call request may be transmitted through the second network.

According to various embodiments of the present disclosure, when the condition in which the acquired value satisfies the second condition is maintained for a second threshold time, a call may be received or a call request may be transmitted through the first network.

According to various embodiments of the present disclosure, the operation of receiving the call or transmitting the call request through the second network may include an operation of registering the electronic device to the second network in a state of maintaining the registration of the first network.

According to various embodiments of the present disclosure, the operation of receiving the call or transmitting the call request through the second network may include the operations of receiving, through the first network, a paging signal for call setup, transmitting a response signal of the paging signal to the first network in order to reject the call setup through the first network, and receiving a call through the second network.

According to various embodiments of the present disclosure, the operation of receiving the call or transmitting the call request through the second network may include the operations of receiving the call or transmitting the call request, by the electronic device, through the first network, and when the acquired value is less than or equal to a first threshold value, registering to the second network in a state of maintaining the registration of the first network and receiving the call or transmitting the call request, by the electronic device, through the second network.

According to various embodiments of the present disclosure, the operation of receiving the call or transmitting the call request through the first network may include an operation of releasing the registration of the second network when the acquired value is equal to or greater than a second threshold value.

According to various embodiments, the operation may further include, when the acquired value is equal to or greater than a third threshold value (or exceeds the third threshold value) and less than the second threshold value, receiving the call or transmitting the call request through the first network while maintaining the registration of the second network.

According to various embodiments of the present disclosure, the third threshold value may be identical to the first threshold value.

According to various embodiments of the present disclosure, an electronic device may include a communication module, and a controller configured to acquire a value indicating the signal quality of a first network that provides a packet data (or IP) based call service through the communication module, receive a call or transmit a call request (or call setup request) through a second network that provides a circuit-switching based call service when the acquired value satisfies a first condition, and receive a call or transmit a call request through the first network when the acquired value satisfies a second condition.

According to various embodiments of the present disclosure, the controller may be configured to receive the call or transmit the call request through the second network when a state in which the acquired value satisfies the first condition is maintained for a first threshold time.

According to various embodiments of the present disclosure, the controller may be configured to receive the call or transmit the call request through the first network when a state in which the acquired value satisfies the second condition is maintained for a second threshold time.

According to various embodiments of the present disclosure, the controller may be configured to register the electronic device to the second network in a state of maintaining the registration of the first network.

According to various embodiments of the present disclosure, the controller may be configured to receive, through the first network, a paging signal for call setup, transmit, to the first network, a response signal of the paging signal in order to reject call setup through the first network, and receive the call through the second network.

According to various embodiments of the present disclosure, when the electronic device receives the call or transmits the call request through the first network and the acquired value is equal to or less than a first threshold value, the controller may be configured to register the electronic device to the second network while maintaining the registration of the first network, and receive the call or transmit the call request, by the electronic device, through the second network.

According to various embodiments of the present disclosure, when the acquired value is equal to or greater than the second threshold value, the controller may be configured to release the registration of the second network.

According to various embodiments of the present disclosure, when the acquired value is equal to or greater than a third threshold value (or exceeds the third threshold value) and less than the second threshold value, the controller may be configured to receive the call or transmit the call request through the first network while maintaining the registration of the second network.

The term "module" as used herein may, for example, mean a unit including one of hardware, software, and firmware or a combination of two or more of them. The "module" may be interchangeably used with, for example, the term "unit", "logic", "logical block", "component", or "circuit". The "module" may be a minimum unit of an integrated component element or a part thereof. The "module" may be a minimum unit for performing one or more functions or a part thereof. The "module" may be mechanically or electronically implemented. For example, the "module" according to the present disclosure may include at least one of an application-specific integrated circuit (ASIC) chip, a field-programmable gate arrays (FPGA), or a programmable-logic device for performing operations which has been known or are to be developed hereinafter.

According to various embodiments of the present disclosure, at least some of the devices (for example, modules or functions thereof) or the method (for example, operations) according to the present disclosure may be implemented by a command stored in a computer-readable storage medium in a programming module form. The instruction, when executed by a processor (e.g., the processor 120), may cause the one or more processors to execute the function corresponding to the instruction. The computer-readable storage medium may be, for example, the memory 130.

The computer readable recoding medium may include a hard disk, a floppy disk, magnetic media (e.g., a magnetic tape), optical media (e.g., a compact disc read only memory (CD-ROM) and a digital versatile disk (DVD)), magneto-optical media (e.g., a floptical disk), a hardware device (e.g., a ROM, a RAM, a flash memory), and/or the like. In addition, the program instructions may include high class language codes, which can be executed in a computer by using an interpreter, as well as machine codes made by a compiler. The aforementioned hardware device may be configured to operate as one or more software modules in order to perform the operation of the present disclosure, and vice versa.

The programming module according to the present disclosure may include one or more of the aforementioned components or may further include other additional components, or some of the aforementioned components may be omitted. Operations executed by a module, a programming module, or other component elements according to various embodiments of the present disclosure may be executed sequentially, in parallel, repeatedly, or in a heuristic manner. Further, some operations may be executed according to another order or may be omitted, or other operations may be added.

According to various embodiments of the present disclosure, a storage medium may have instructions stored thereon, and when executed by at least one processor, the instructions may be configured to cause the processor to execute at least one operation, the operations including acquiring a value indicating the signal quality of a first network that provides a packet data (or IP) based call service, when the acquired value satisfies a first condition, receiving a call or transmitting a call request (or call setup request) through a second network that provides a circuit-switching based call service, and, when the acquired value satisfies a second condition, receiving a call or transmitting a call request through the first network.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. A method for communicating with at least one of a first network that provides a long term evolution (LTE) network or a second network that provides a circuit-switched (CS) network by an electronic device, the method comprising:
   acquiring a first signal quality of the first network of which a first communication is established;
   based on the first signal quality is-being greater than a first threshold when a voice over long term evolution (VoLTE) call request is received, performing a VoLTE call for the VoLTE call request through the first communication;

based on the first signal quality being equal to or less than the first threshold when the VoLTE call request is received:
  establishing a second communication with the second network, and
  after completing a circuit switched (CS) call setup based on a call forwarding of the VoLTE call request, performing, through the second communication with the second network, a CS call while maintaining the establishment of the first communication with the first network;
acquiring a second signal quality of the first network of which the first communication is established;
based on the second signal quality being greater than a second threshold which is greater than the first threshold when another VoLTE call request is received in a state that the establishment of the second communication with the second network is maintained:
  releasing the second communication with the second network, and
  performing another VoLTE call for the other VoLTE call request through the first communication; and
based on the second signal quality being greater than a third threshold and being equal to or less than the second threshold when the other VoLTE call request is received in the state that the establishment of the second communication with the second network is maintained, performing the other VoLTE call for the other VoLTE call request through the first communication while maintaining the establishment of the second communication with the second network.

2. The method of claim 1, wherein the establishing of the second communication with the second network further comprises:
  based on the first signal quality being equal to or less than the first threshold during a first threshold time when the VoLTE call request is received, establishing the second communication with the second network.

3. The method of claim 1, wherein the performing, through the second communication with the second network, of the CS call further comprises:
  receiving, through the first communication with the first network, a paging signal for a VoLTE call setup initiated by the VoLTE call request;
  transmitting a response signal of the paging signal to the first network in order to reject the VoLTE call setup through the first communication with the first network; and
  receiving a paging signal for the CS call setup through the second communication with the second network.

4. The method of claim 1, wherein the third threshold is identical to the first threshold.

5. An electronic device comprising:
a transceiver configured to communicate with at least one of a first network that provides a long term evolution (LTE) network or a second network that provides a circuit-switched (CS) network; and
at least one processor configured to:
  acquire a first signal quality of the first network of which a first communication is established using the transceiver,
  if the first signal quality is greater than a first threshold when a voice over long term evolution (VoLTE) call request is received, perform a VoLTE call for the VoLTE call request through the first communication,
  if the first signal quality is equal to or less than the first threshold when the VoLTE call request is received:
    establish a second communication with the second network using the transceiver, and
    after completing a circuit switched (CS) call setup based on a call forwarding of the VoLTE call request, perform, through the second communication with the second network, a CS call while maintaining the establishment of the first communication with the first network,
  acquire a second signal quality of the first network of which the first communication is established,
  if the second signal quality is greater than a second threshold which is greater than the first threshold when another VoLTE call request is received in a state that the establishment of the second communication with the second network is maintained:
    release the second communication with the second network, and
    perform another VoLTE call for the other VoLTE call request through the first communication, and
  if the second signal quality is greater than a third threshold and is equal to or less than the second threshold when the other VoLTE call request is received in the state that the establishment of the second communication with the second network is maintained, perform the other VoLTE call for the other VoLTE call request through the first communication while maintaining the establishment of the second communication with the second network.

6. The electronic device of claim 5, wherein the at least one processor is further configured to, if the first signal quality is equal to or less than the first threshold during a first threshold time when the VoLTE call request is received, establish the second communication with the second network.

7. The electronic device of claim 5, wherein the at least one processor is further configured to:
  receive a paging signal for a VoLTE call setup initiated by the VoLTE call request through the first communication with the first network,
  transmit, to the first network, a response signal of the paging signal in order to reject the VoLTE call setup through the first communication with the first network, and
  receive a paging signal for the CS call setup through the second communication with the second network.

8. The electronic device of claim 5, wherein the third threshold is identical to the first threshold.

* * * * *